(12) United States Patent
Lewis

(10) Patent No.: US 6,212,875 B1
(45) Date of Patent: Apr. 10, 2001

(54) DIRECT FIRED COMPRESSOR AND METHOD OF PRODUCING COMPRESSED AIR

(76) Inventor: Brian F. Lewis, 125 Woodbine, Terre Haute, IN (US) 47803

( * ) Notice: Subject to any disclaimer, the term of this patent is extended or adjusted under 35 U.S.C. 154(b) by 0 days.

(21) Appl. No.: 09/287,977

(22) Filed: Apr. 7, 1999

(51) Int. Cl.[7] .................................................. F02G 1/00
(52) U.S. Cl. .............................. 60/39.78; 60/39.76
(58) Field of Search ........................ 60/39.34, 39.76, 60/39.77, 39.78, 39.39, 247, 39.38

(56) References Cited

U.S. PATENT DOCUMENTS

| | | | |
|---|---|---|---|
| 2,579,321 | * 12/1951 | Kadenacy | 60/39.39 |
| 2,705,867 | * 4/1955 | Lewis | 60/39.78 |
| 3,516,253 | 6/1970 | Allport et al. | 60/39.77 |
| 3,678,692 | 7/1972 | Heise | 60/247 |
| 3,774,398 | 11/1973 | Etessam | 60/248 |
| 3,877,219 | 4/1975 | Hagen | 60/39.38 |
| 3,938,327 | 2/1976 | Bailey et al. | 60/39.77 |
| 3,954,380 | 5/1976 | Valaev et al. | 431/1 |
| 4,175,380 | 11/1979 | Baycura | 60/39.06 |
| 4,241,576 | 12/1980 | Gertz | 60/39.34 |
| 4,538,410 | 9/1985 | Klaebo | 60/39.02 |
| 4,671,056 | 6/1987 | Genz et al. | 60/39.77 |
| 4,741,154 | 5/1988 | Eidelman | 60/39.34 |
| 4,840,558 | 6/1989 | Saito et al. | 431/1 |
| 4,884,963 | 12/1989 | Kardos | 431/1 |
| 4,962,641 | 10/1990 | Ghougasian | 60/249 |
| 5,020,987 | 6/1991 | Ishiguro et al. | 431/1 |
| 5,287,696 | 2/1994 | Shigemi | 60/39.141 |
| 5,345,758 | 9/1994 | Bussing | 60/39.38 |
| 5,513,489 | 5/1996 | Bussing | 60/39.38 |

* cited by examiner

Primary Examiner—Noah P. Kamen
(74) Attorney, Agent, or Firm—Ice Miller; Jay G. Taylor; Russell E. Fowler, II

(57) ABSTRACT

An air compressor device and method for producing compressed air. The device comprises a rotatable cylinder assembly having a drive shaft extending along a central axis and three equally sized combustion chambers extending parallel to the center axis. The drive shaft is connected to a turbine or other drive means which provides rotational movement to the drive shaft and cylinder assembly. Two circular end plates are concentrically positioned with the central axis on each end of the cylinder assembly. The end plates are stationary with respect to the rotatable cylinder assembly and comprise an intake plate and an outlet plate. Openings are provided on the end plates to allow for communication of a gas into and out of the combustion chambers at designated times during operation of the compressor. A fuel injector is positioned upon the intake plate along with an ignition means. The device operates on a modified Schmidt-type pulsejet cycle. Fresh air is received in each of the chambers and compressed. A fuel/air mixture provided by the fuel injector is combusted to further compress the fresh air within the chambers. A high pressure receiver is provided in communication with the output plate for receiving compressed air and delivering the compressed air to a particular application. An exhaust port is also provided in communication with the output plate for disposing of exhaust gasses separate from the compressed air. The high pressure receiver operates to dampen the pressurized air pulsations from the chambers, and outputs a relatively smooth flow of pressurized air separate from the exhaust stream.

29 Claims, 30 Drawing Sheets

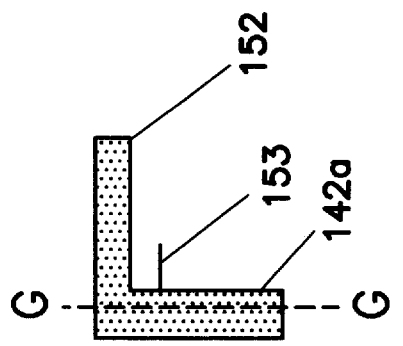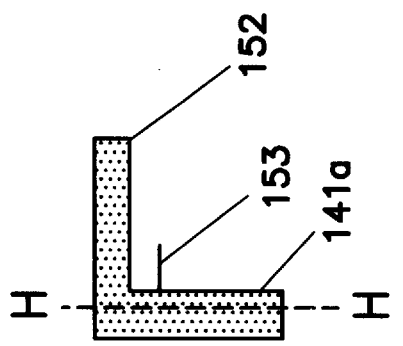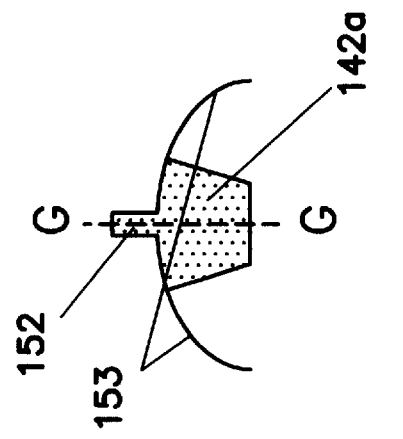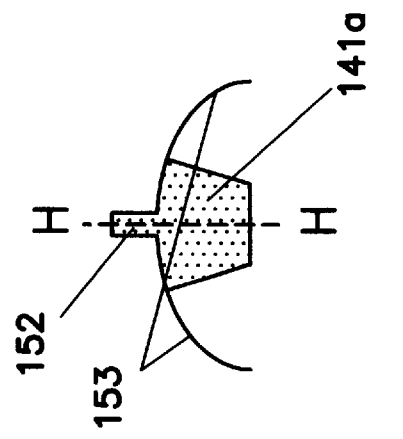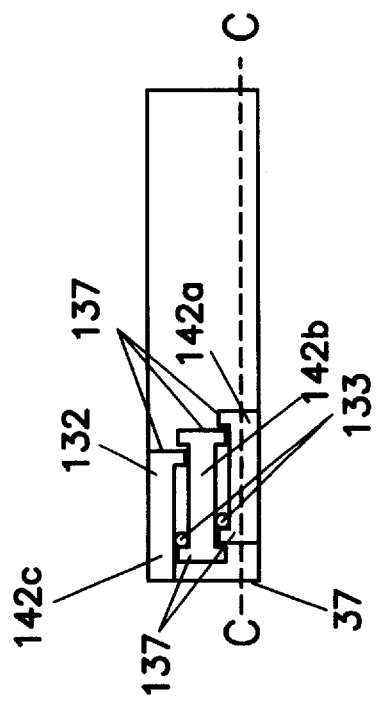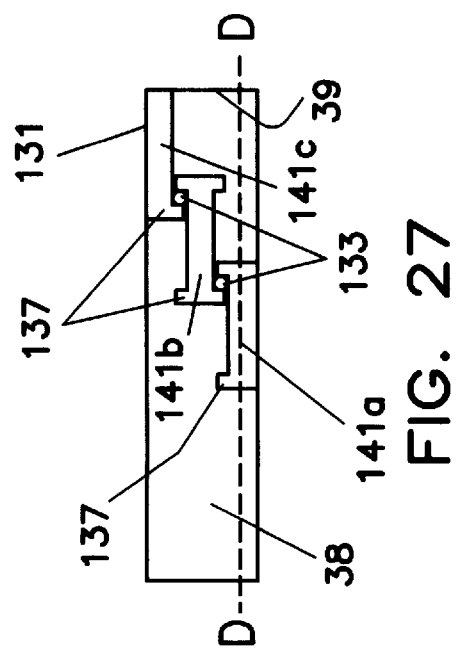

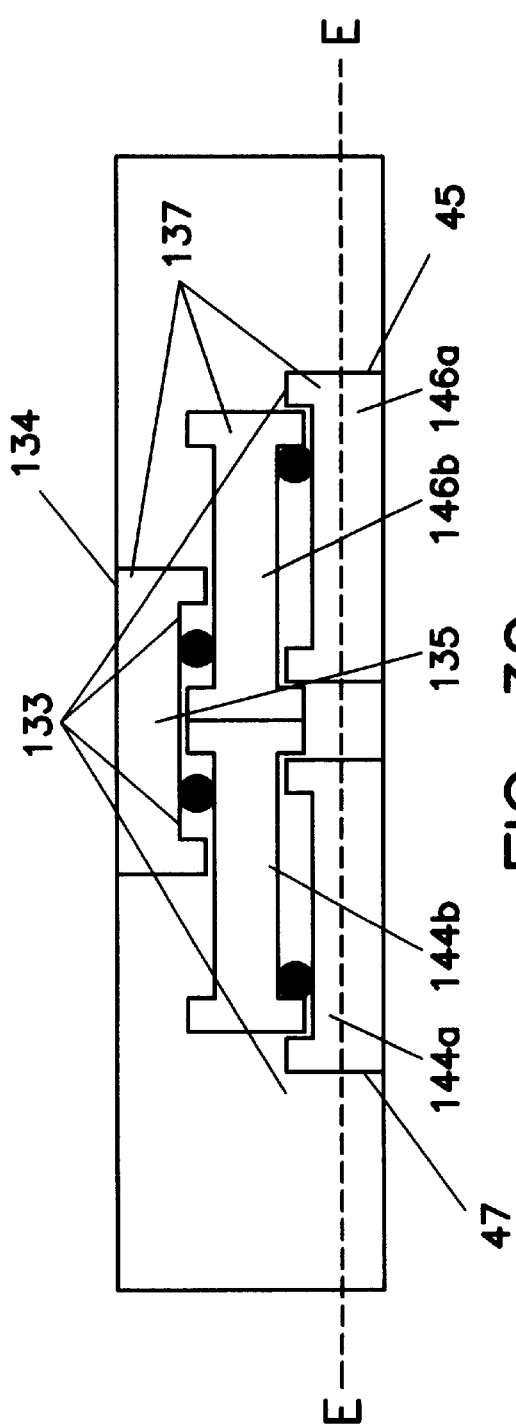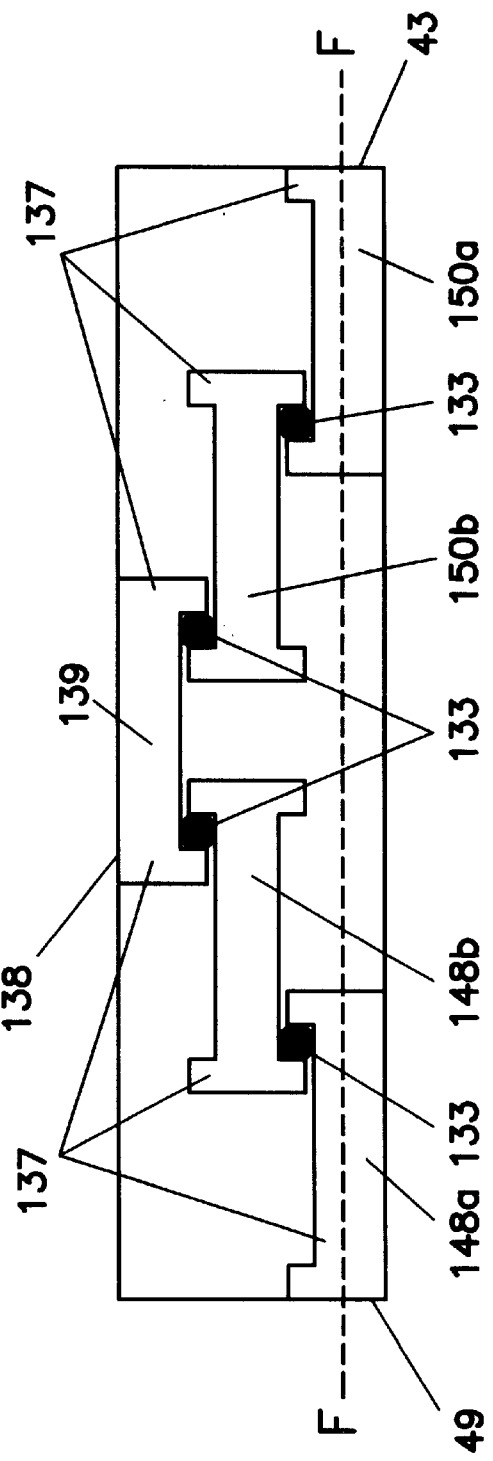

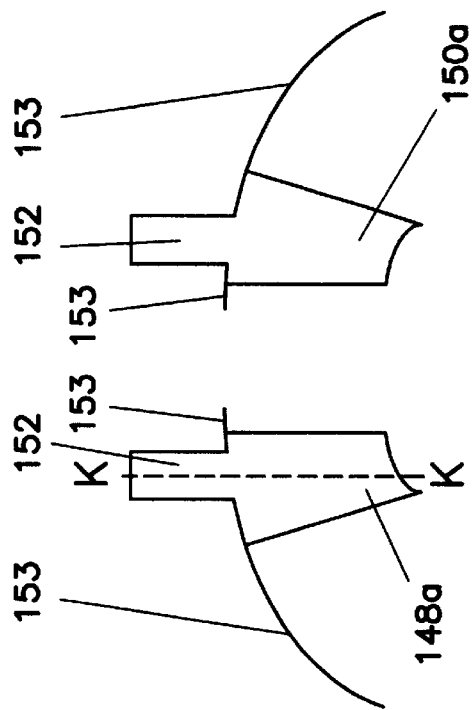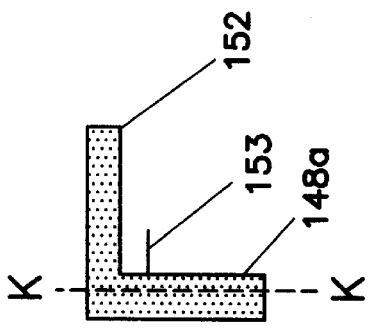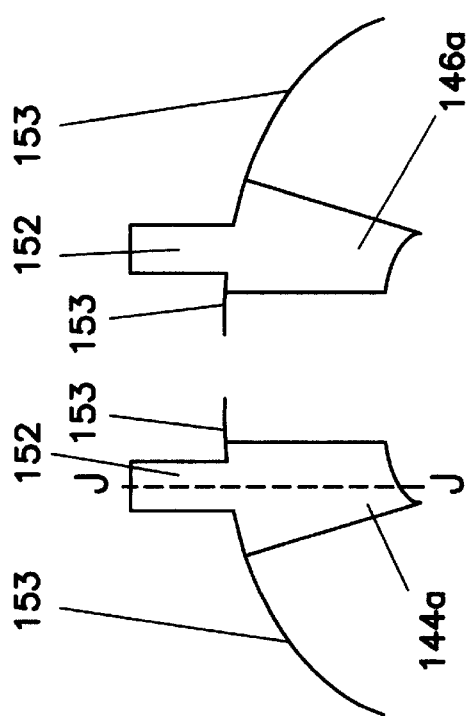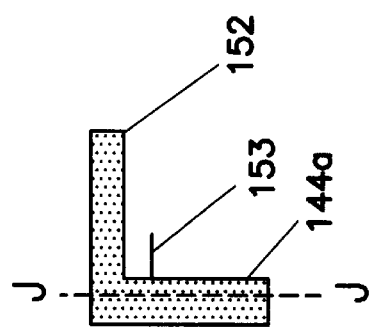

DIRECT FIRED COMPRESSOR AND METHOD OF PRODUCING COMPRESSED AIR

BACKGROUND OF THE INVENTION

1. Field of the Invention

The present invention relates to the field of gas turbine engines and jet propulsion. More particularly, the present invention relates to a combustor and gas compressor for use in a gas turbine engine.

2. Description of the Prior Art

Several past devices have been used to increase the pressure of a gas. These devices include, but are not limited to, gas turbines, constant volume combustors, pulse jets, thermal pulse combustors, pulse detonation jets, reciprocating compressors, axial compressors and centrifugal compressors.

Many of these prior devices, including constant volume combustors, pulse jets, thermal pulse combustors, and pulse detonation jets have used the force of combustion to increase gas pressure or induce gas flow. In each of these devices, a single output stream is utilized to discharge gasses from a combustion chamber. The output stream often contains combustion products diluted with excess unconsumed air, depending upon the operating temperature of the device. As a result of the combustion cycle, the output stream is generally high in temperature and intermittent in nature.

The intermittent nature and high temperature of the output stream makes the output from the prior art devices unsuitable for many compressed air applications. For example, the output temperature may be too high for use in a turbine or the intermittent nature of the output may cause stress and surging in the turbine. Any attempt to decrease the exhaust temperature by burning a lean combustible mixture results in poor combustion characteristics and generation of undesirable emissions. Further, when the prior art devices are used as jet engines, they are limited by the need to operate at high temperatures to gain thermal efficiency. This high temperature limits the amount of air handled, and this in turn limits the mass flow, an important element in determining the efficiency of a jet engine, because most or all of the air entering the device is consumed and discharged as combustion products.

If the excess unconsumed air could be separated from the spent gasses in the output stream and recovered as a pressurized, cooler stream, the unconsumed air could be used for a variety of applications. In one such application, the pressurized unconsumed product is used to compress air within the combustion chamber during a compression step of the operating cycle, thereby further increasing the pressurized output from each compression step. By this application, the mass of air handled per unit of energy delivered would be increased, and the specific output of the engine would also be increased. In other applications, the pressurized unconsumed product may be delivered through a nozzle for use as a jet engine, distributed to a turbine to provide rotational power, or used as a simple air compressor. Such a cycle would result in a large fraction of the air handled being transformed to compressed, unconsumed air at slightly elevated temperatures and the fraction of air remaining being exhausted at ambient pressure and elevated temperature.

Other of the prior art devices, including reciprocating compressors, axial compressors, and centrifugal compressors, are limited by their requirement of an external power source to provide the energy for compression of the air. If an internal power source could be used to provide energy for air compression, the compressor could be simplified.

Accordingly, it is an advantage of the present invention to provide an air compressor having separate pressurized air product and exhaust streams, such that the pressurized air product stream may be used separately from the exhaust stream.

It is another advantage of the invention to provide an air compressor wherein the pressurized air product output stream is held in a receiving tank and then used to further compress gasses in a combustion chamber before combustion of the gasses.

A further advantage of the invention is to provide a simplified air compressor which does not require a large external power source for operation.

It is a further advantage of the proposed device to offer simpler construction and operation than gas turbines and reciprocating, axial, and centrifugal compressors, and greater ranges of operation than pulse combustion devices such as detonation engines, pulse combustors, and pulse jets.

SUMMARY OF THE INVENTION

The direct fired compressor of the present invention comprises a rotatable cylinder assembly having a drive shaft extending along a central axis. The drive shaft is connected to an electric motor or turbine which provides rotational movement to the drive shaft and cylinder assembly. The cylinder assembly comprises one or more, and preferably three, equally sized combustion chambers extending axially along the length of the cylinder, parallel to the central axis. The combustion chambers are defined by axial walls within the cylinder assembly. The axial walls may be formed by a single large cylinder centered about the cylinder axis with three combustion chambers formed therein or, alternatively, by three distinct cylinders, each cylinder forming a combustion chamber extending parallel to the cylinder axis.

The cylinder assembly further comprises an intake end and an outlet end. Two circular end plates are concentrically positioned with the central axis on each end of the cylinder assembly. The end plates are stationary with respect to the rotatable cylinder assembly and comprise an intake plate adjacent to the intake end of the cylinder assembly and an outlet plate adjacent to the outlet end of the cylinder assembly. Openings are provided on the end plates to allow for communication of a gas into and out of the combustion chambers at designated times during operation of the direct fired compressor. A fuel injector is positioned upon the intake plate to provide a volatile mixture to the combustion chambers. An ignition means is also positioned upon the intake plate to ignite the volatile mixture within the combustion chambers.

A high pressure receiver, or receiving chamber, is provided in communication with the output plate for receiving compressed air. The high pressure receiver includes an outlet port for delivering pressurized air from the direct fired compressor to an application. An exhaust port is also provided in communication with the output plate for disposing of exhaust gasses.

The direct fired compressor utilizes a seven step process for producing compressed air. An intake step allows fresh, noncombustible (or partially combustible) air to flow into one of the combustion chambers by providing openings to the chamber on both the intake and output ends of the combustion chamber. Next, the closure step seals the combustion chambers from outside air and rotates the chambers toward communication with the air in a high pressure receiver. A primary compression step opens the output end of the combustion chamber to the high pressure receiver containing high pressure air which compresses the air within the combustion chamber. In an injection step, the output end of the combustion chamber remains open to the high pressure receiver and intake end is opened to a fuel injector which inserts fuel into a fraction of the non-combustible air into a fraction of the air located at the intake end of the combustion chamber to produce a combustible or "volatile" mixture.

In a combustion step, the intake end is exposed to an ignition means which ignites the combustible mixture, causing the combustible mixture to expand. Expansion of the combustible mixture compresses the unburned air in the combustion chamber and forces the compressed air toward the outlet end of the combustion chamber where the compressed air flows through a discharge port and into the high pressure receiver. The compressed air flows into the high pressure receiver because the pressure of the compressed air in the chamber is higher than the pressure maintained in the high pressure receiver immediately following combustion.

In a closure step, both chamber ends are blanked and the combustion chamber is rotated into communication with an exhaust port. The final exhaust step opens the output end of the combustion chamber and the remaining combusted gas, or spent gas, is allowed to flow through the exhaust port and out of the chamber. Completion of the exhaust step returns the combustion chamber to the intake step where both ends of the chamber are opened and fresh, non-combustible air is allowed to flow into the chamber again.

As this process is repeated for each of the chambers, pressurized air builds in the high pressure receiver. When the air pressure in the high pressure receiver reaches a predetermined level, the outlet port discharges air from the high pressure receiver. The high pressure receiver operates to dampen the pressurized air pulsations from the cylinder assembly discharge port, and outputs a relatively smooth flow of pressurized air.

Various applications are possible for the stream of pressurized air from the high pressure receiver. For example, the high pressure stream may be channeled through a nozzle for use as a jet engine, distributed to a turbine to provide rotational power, or used as a simple air compressor.

BRIEF DESCRIPTION OF THE DRAWINGS

FIG. 26 shows a sectional view of the intake plate of FIG. 22 along line C—C;

FIG. 27 shows a sectional view of the intake plate of FIG. 22 along line D—D;

FIG. 28a shows a sectional view of the tuning plate of FIG. 26 along line C—C;

FIG. 28b shows a sectional view of the tuning plate of FIG. 28a along line G—G;

FIG. 29a shows a sectional view of the tuning plate of FIG. 27 along line D—D;

FIG. 29b shows a sectional view of the tuning plate of FIG. 27 along line H—H;

FIG. 30 shows a sectional view of the exhaust plate of FIG. 23 along line E—E;

FIG. 31 shows a sectional view of the exhaust plate of FIG. 23 along line F—F;

FIG. 32a shows a sectional view of the tuning plate of FIG. 30 along line E—E;

FIG. 32b shows a sectional view of the tuning plate of FIG. 30 along line J—J;

FIG. 33a shows a sectional view of the tuning plate of FIG. 31 along line F—F:

FIG. 33b shows a sectional view of the tuning plate of FIG. 31 along line K—K.

DETAILED DESCRIPTION

Figure 1:
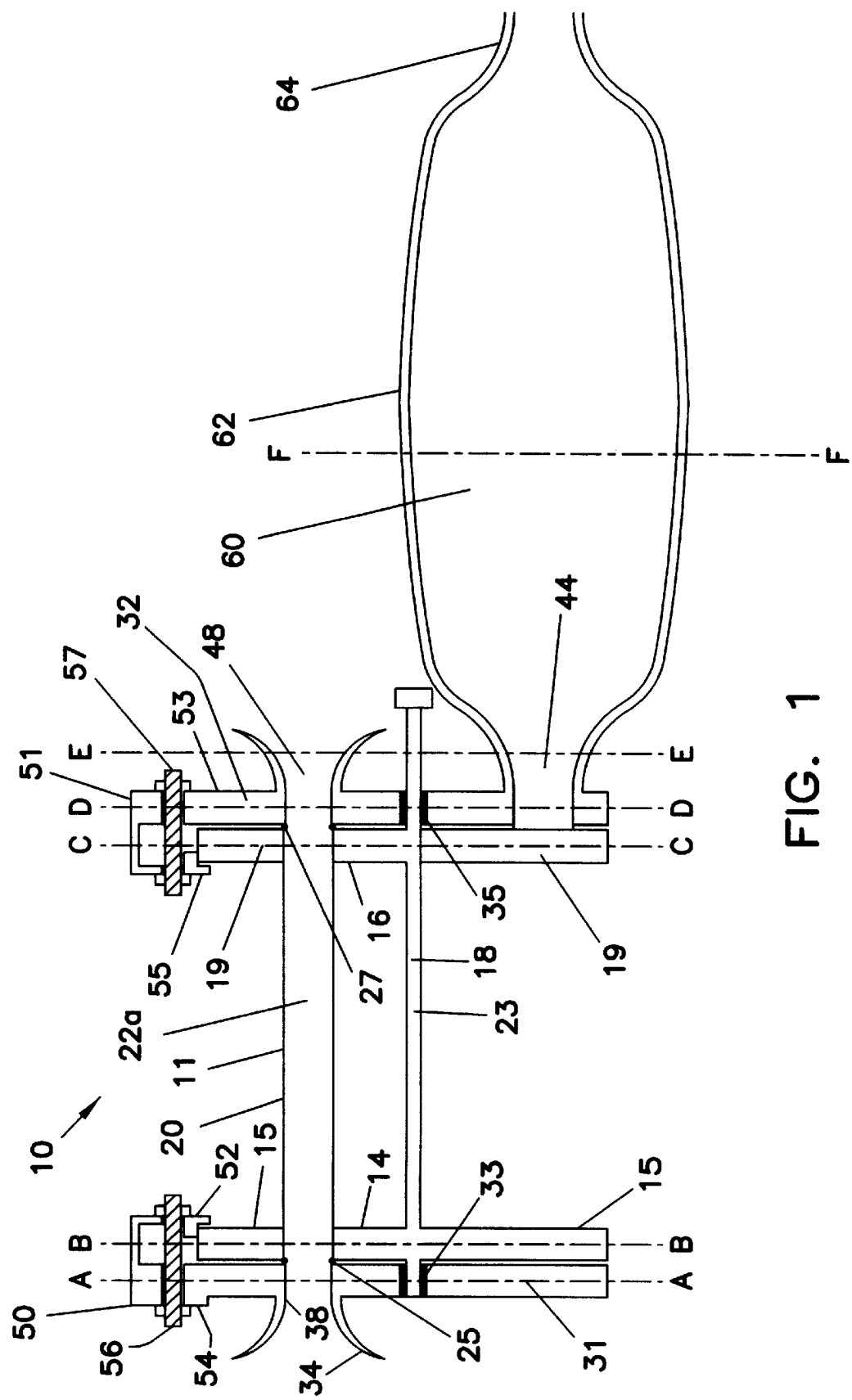
FIG. 1 shows a longitudinal cross-sectional view of a gas compressor which constitutes a first embodiment of the invention.
Figure 2:
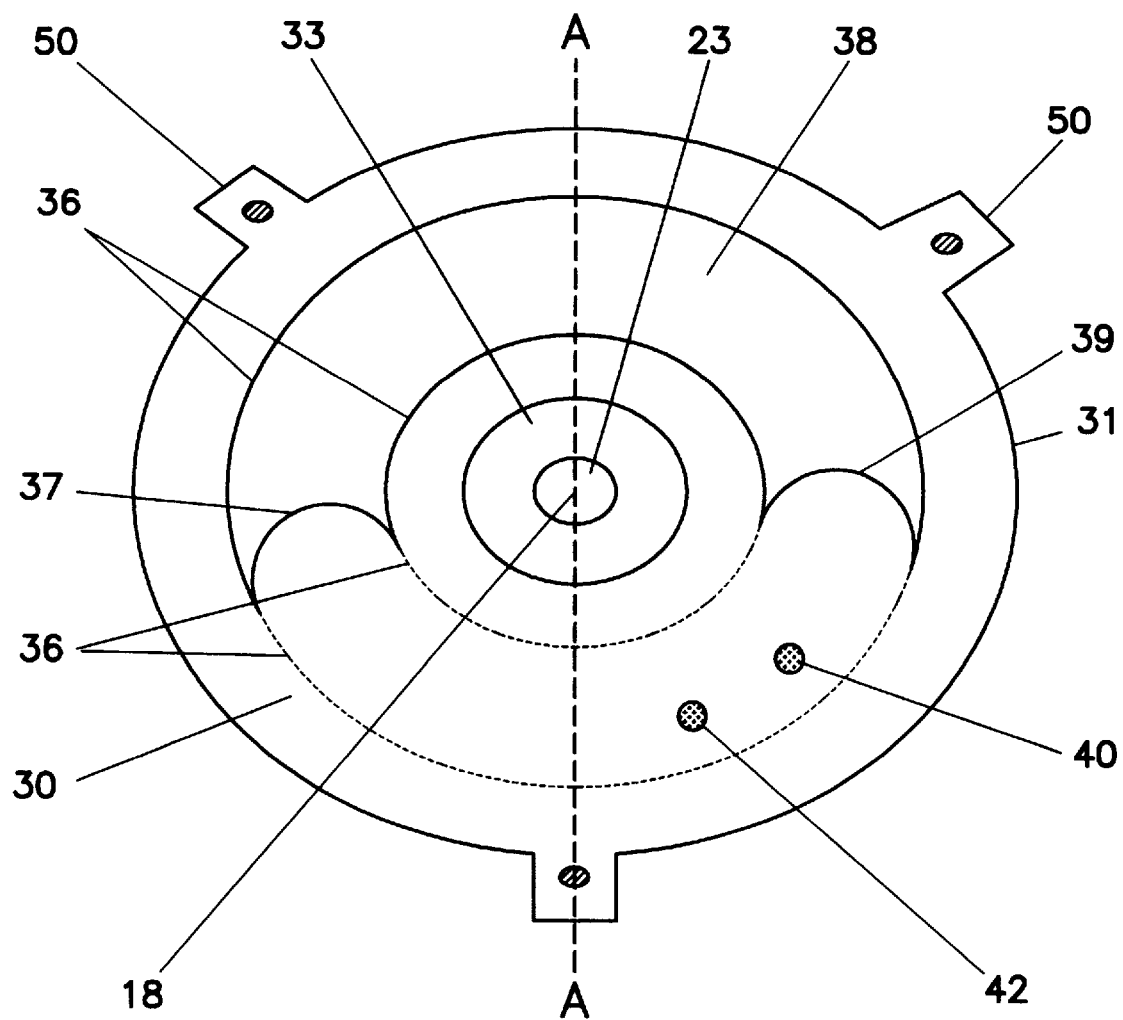
FIG. 2 shows a sectional view of the gas compressor of FIG. 1 along line A—A.
Figure 3:
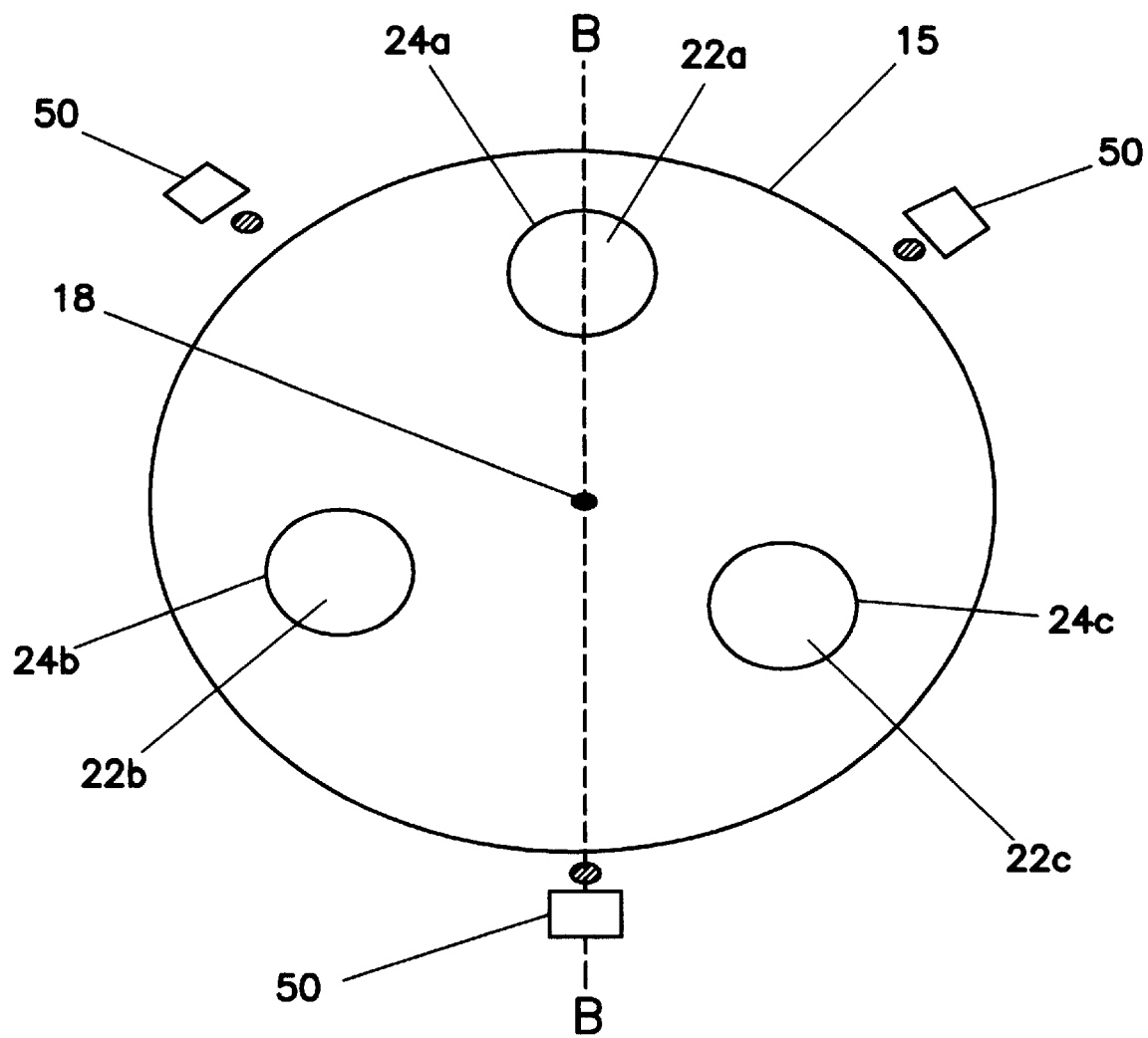
FIG. 3 shows a sectional view of the gas compressor of FIG. 1 along line B—B.
Figure 4:
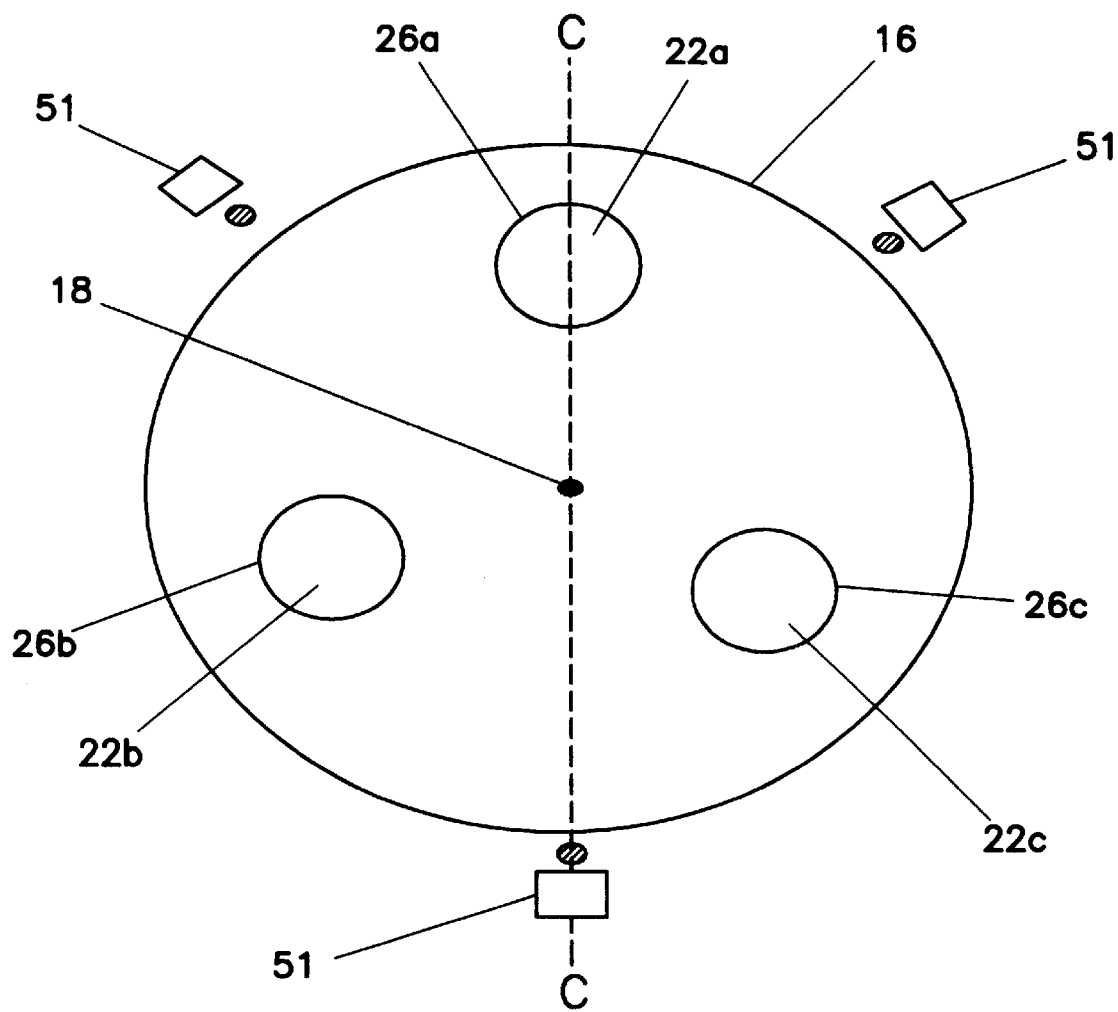
FIG. 4 shows a sectional view of the gas compressor of FIG. 1 along line C—C.

As shown in FIGS. 1–7, one embodiment of a direct fired compressor 10 according to the present invention comprises a cylindrical chamber assembly 11 which is rotatable with respect to a pair of end plates 31 and 32. Cylindrical chamber assembly 11 has an intake end 14 which is adjacent to one end plate 31, an exhaust end 16 which is adjacent to the other end plate 32, and a center axis 18. Chamber assembly 11 further includes chamber walls 20 defining a first chamber 22a, a second chamber 22b (FIGS. 3–4), and a third chamber 22c (FIGS. 3–4) within chamber assembly 11. As illustrated in FIGS. 1, 3, and 4, in this embodiment, chambers 22a, 22b, and 22c extend the length of chamber assembly 11 parallel to center axis 18 such that each chamber 22a, 22b, or 22c is 120° separated from the other chambers around center axis 18. Chambers 22a, 22b, and 22c are equally sized and each chamber has a circular cross section.

A circular front face 15 is positioned upon intake end 14 of chamber assembly 11. Front face 15 has a circumference which encircles chambers 22a, 22b, and 22c at intake end 14. As shown in FIG. 3, openings are formed on front face 15 to provide a first chamber mouth 24a, a second chamber mouth 24b and a third chamber mouth 24c. Each mouth 24a, 24b, and 24c provides for entry into one of the respective chambers 22a, 22b, or 22c of chamber assembly 11.

Similar to the structure at the intake end 14, exhaust end 16 of chamber assembly 11 includes a circular back face 19 which covers exhaust end 16. Back face 19 has a circumference which encircles chambers 22a, 22b, and 22c at exhaust end 16. As shown in FIG. 4, openings are formed on back face 19 to provide a first drain 26a, a second drain 26b and a third drain 26c. Each drain 26a, 26b, and 26c provides an outlet from one of the respective chambers 22a, 22b, or 22c.

Front and back circular end plates 31 and 32, respectively are positioned adjacent to intake end 14 and exhaust end 16, respectively, of chamber assembly 11, such that end plates 31 and 32 are coaxial with center axis 18 of chamber assembly 11. End plates 31 and 32 comprise an intake plate 31 and an exhaust plate 32, respectively.

Intake plate 31 is positioned adjacent to intake end 14 of chamber assembly 11 and has a plate circumference aligned with and equal to the circumference of front face 15. As shown in FIG. 2, intake plate 31 further includes a circular intake track 36 concentric with center axis 18. Intake track 36 includes an intake port 38 for allowing air to pass through intake plate 31 and into chambers 22a, 22b, and 22c through mouths 24a, 24b, and 24c, respectively. Intake port 38 extends over a portion of intake track 36 and includes a forward end 37 and a rearward end 39. A venturi 34 may be connected to intake port 38 to provide for efficient entry of air into chambers 22a, 22b, and 22c. Also positioned upon intake track 36 is a fuel injection port 40 and an ignition port 42. Fuel injection port 40 is capable of receiving a fuel injector (not shown) for inserting fuel into chambers 22a, 22b, and 22c. Ignition port 42 is capable of receiving a spark plug (not shown) for providing a spark to ignite the fuel placed in one of chambers 22a, 22b, or 22c by the fuel injector. Additionally, a center bore 33 is formed in intake plate 31 concentric with center axis 18.

Chamber mouths 24a, 24b, and 24c are positioned against intake track 36 with front seals 25 such that mouths 24a, 24b, and 24c and associated chambers 22a, 22b, and 22c can rotate around track 36. Front seals 25 include carbon or similar seal rings placed into seal seats (not shown) in chamber mouths 24a, 24b, and 24c. Front seals 25 engage intake track 36 to provide an air tight fit between chambers 22a, 22b, and 22c and intake plate 31, while allowing rotation of chambers 22a, 22b, and 22c with respect to intake plate 31.

Front guides 50 are positioned along the circumference of front face 15 and intake plate 31, respectively. As shown in FIGS. 2–3, front guides 50 are positioned 120° apart from each other around intake plate 31. The front guides 50 are integral with intake plate 31 along a bridge portion 54. On the opposite side of each front guide 50 from the bridge portion 54, an arm 52 extends slightly past the circumference of front face 15 but does not reach chambers 22a, 22b, and 22c or intake track 36. A ball bearing or other friction reducing device is placed between arm 52 and front face 15. A bolt 56 is provided upon guide 50 to adjust the distance between arm 52 and bridge portion 54. Guides 50 provide for proper alignment of chamber assembly 11 with intake plate 31. Guides 50 also act as retainers to prevent intake plate 31 from pushing away from chamber assembly 11 during operation of direct fired compressor 10.

Figure 5:
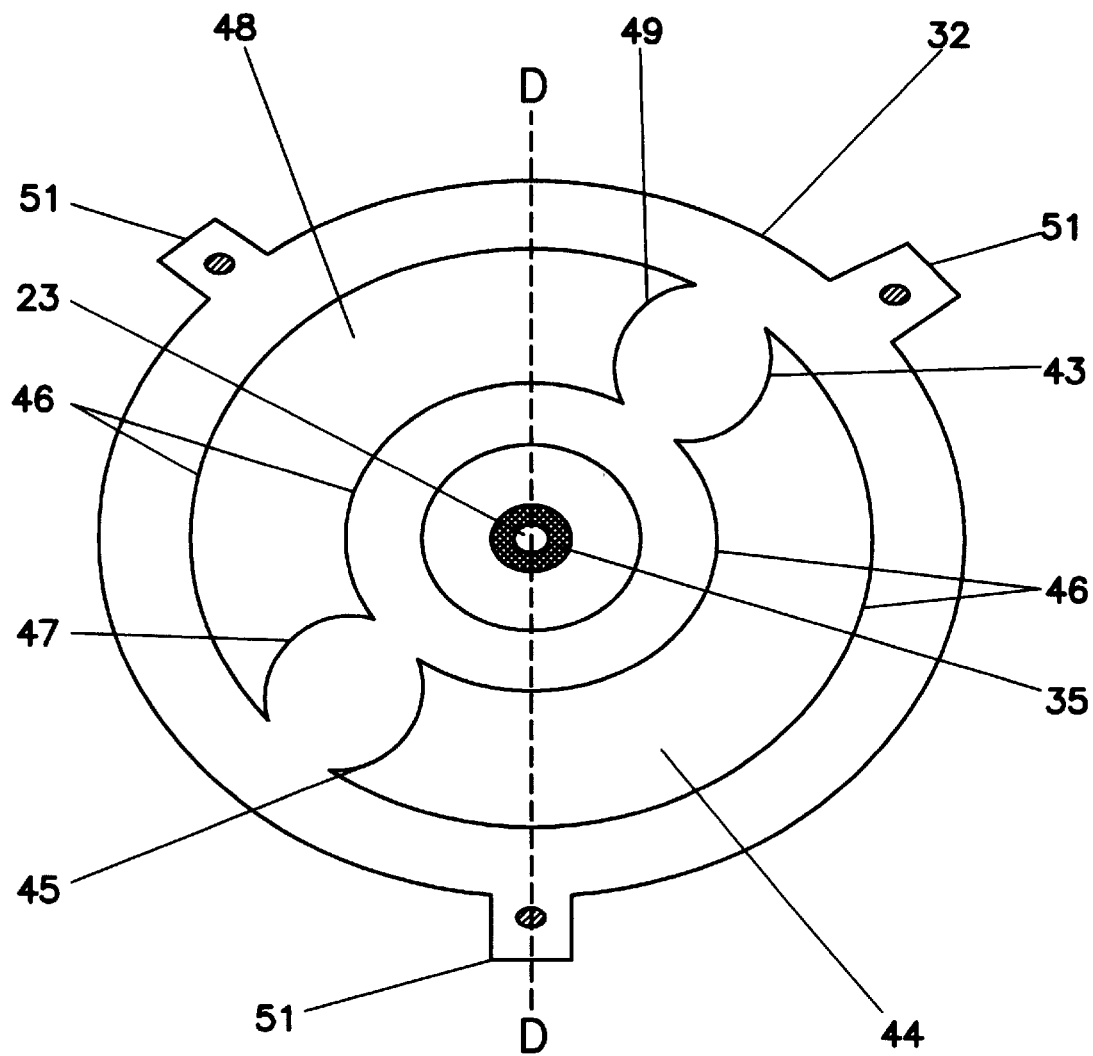
FIG. 5 shows a sectional view of the gas compressor of FIG. 1 along line D—D.
Figure 6:
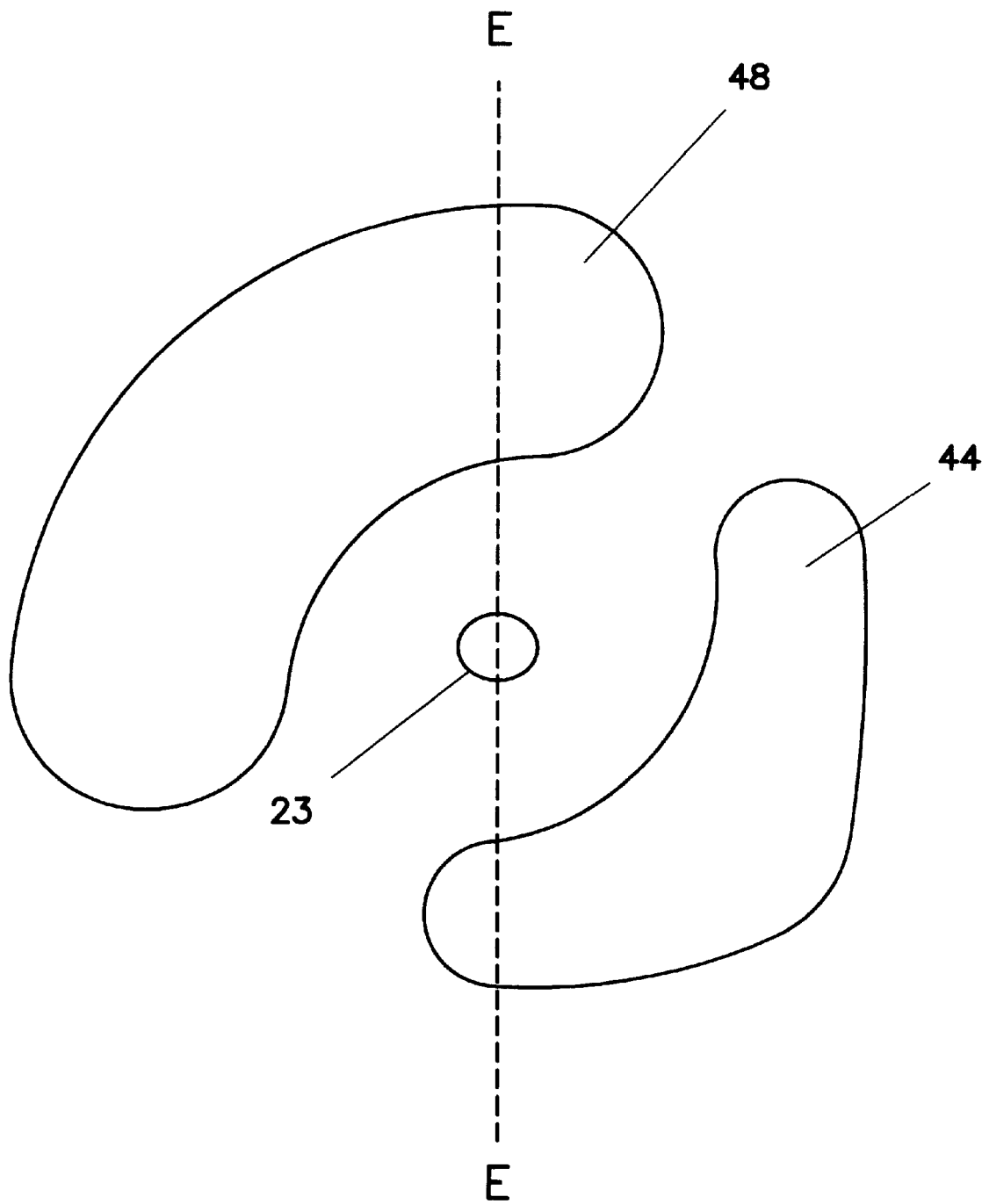
FIG. 6 shows a sectional view of the gas compressor of FIG. 1 along line E—E.
Figure 7:
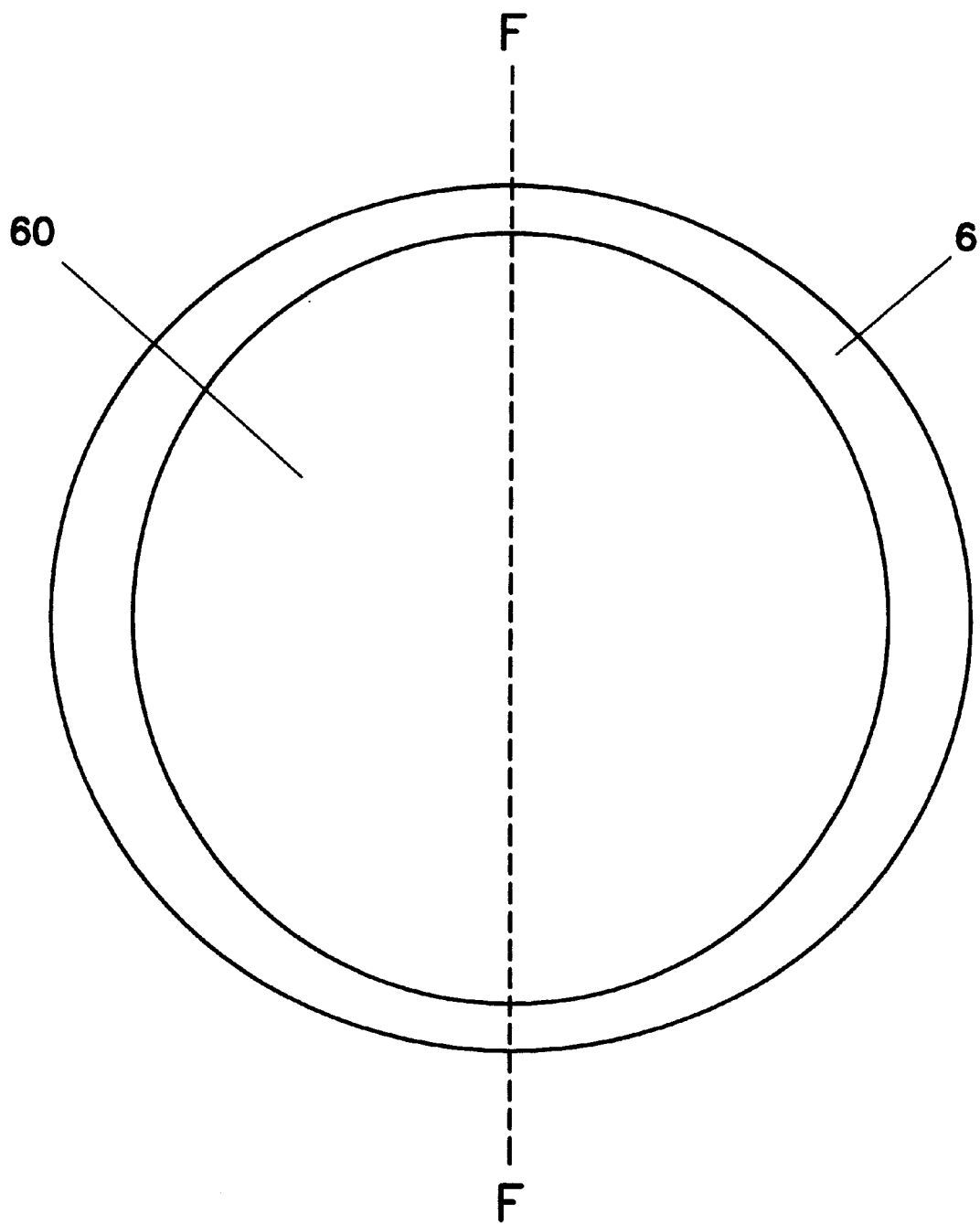
FIG. 7 shows a sectional view of the gas compressor of FIG. 1 along line F—F.

Exhaust plate 32 is positioned adjacent to exhaust end 16 of chamber assembly 11 and has a plate circumference aligned with and equal to the circumference of back face 19. As shown in FIG. 5, exhaust plate 32 includes a circular exhaust track 46 concentric with center axis 18. Exhaust track 46 includes an exhaust port 48 for allowing exhaust gas to pass from chambers 22a, 22b, and 22c and out of compressor 10. Exhaust port 48 extends over a portion of exhaust track 46 and includes a forward end 47 and a rearward end 49. A primary discharge port 44 is also included upon exhaust track 46 for providing an opening for compressed air to leave chambers 22a, 22b, and 22c. Discharge port 44 extends over a portion of exhaust track 46 separate from exhaust port 48, and includes a forward end 43 and a rearward end 45. Additionally, a center bore 35 is formed in exhaust plate 32 concentric with center axis 18.

Referring to FIGS. 4 and 5, chamber drains 26a, 26b, and 26c are positioned against exhaust track 46 with back seals 27 such that drains 26a, 26b, and 26c and associated chambers 22a, 22b, and 22c can rotate around track 46. Back seals 27 include carbon or similar seal rings placed into seal seats (not shown) in chamber drains 26a, 26b, and 26c. Back seals 27 engage exhaust track 46 to provide an air tight fit between chambers 22a, 22b, and 22c and exhaust plate 32, while allowing rotation of chambers 22a, 22b, and 22c with respect to exhaust plate 32.

Back guides 51 are positioned along the circumference of back face 19 and exhaust plate 32, respectively. As shown in FIGS. 4–5, back guides 51 are positioned 120° apart from each other around exhaust plate 32. The back guides 51 are integral with exhaust plate 32 along a bridge portion 53. On the opposite side of each rear guide 51 from the bridge portion 53, an arm 55 extends slightly past the circumference of back face 19 but does not reach chambers 22a, 22b, and 22c or exhaust track 46. A ball bearing or other friction reducing device is placed between arm 55 and back face 19. A bolt 57 is provided upon each guide 51 to adjust the distance between first arm 55 and bridge portion 54. Guides 51 provide for proper alignment of chamber assembly 11 with exhaust plate 32. Guides 51 also act as retainers to prevent exhaust plate 32 from pushing away from chamber assembly 11 during operation of direct fired compressor 10.

Connected to primary discharge port 44 is a high pressure receiver 60 comprising a primary receiving tank 62. High pressure receiver 60 accepts compressed gasses from chambers 22a, 22b, and 22c through discharge port 44. Receiving tank 62 is designed to retain the compressed gasses until the pressure in tank 62 reaches a predetermined critical pressure. Receiving tank 62 must be capable of holding a volume greater than that of each individual chamber 22a, 22b, or 22c. A high pressure outlet port 64 is included on high pressure receiver 60 which expels compressed gasses from receiving tank 62 when the pressure in tank 62 reaches the predetermined critical pressure.

Chamber assembly 11 is rotatable with respect to end plates 31 and 32 about center axis 18. Rotation of chamber assembly 11 is procured by a drive shaft 23 which runs along center axis 18 of chamber assembly 11. Drive shaft 23 is integral with front face 15 and back face 19 at their respective centers, and extends through front face 15 and back face 19. Drive shaft 23 extends slightly past intake end 14 of chamber assembly 11 and is supported by a bearing or bushing positioned within center bore 33 of intake plate 31. Drive shaft 23 also extends past exhaust end 16 of chamber assembly 11, through center bore 35 of exhaust plate 32 where it is supported by a bushing or bearing, and to a drive mechanism (not shown). The drive mechanism may be any of various drive means such as an electric motor or a turbine.

The configuration described is easily fabricated from readily available tubing and plate. It is to be understood that increasing the number of chambers beyond 2 decreases the effective use of frontal area and chamber assembly 11 volume while decreasing the required size of the receiver 60. Three chambers are preferred as the best balance between the maximum effective use of frontal area (17% with 2 chambers and 11% with 3), and the minimum required volume of the receiving chamber 60 (33% less with three chambers than with 2).

Operation of direct fired compressor 10 is now described. To start direct fired compressor 10, the drive mechanism is activated to cause rotation of drive shaft 23 at a desired speed. The desired speed is typically the resonant frequency of the direct fired compressor, as described ten paragraphs below. Rotation of drive shaft 23 in the clockwise direction as viewed from FIG. 2 causes chamber assembly 11 to spin about center axis 18. Rotation of drive shaft 23 and chamber assembly 11 in the counter-clockwise direction is also possible if the ports on end plates 31 and 32 are arranged for operation in the counter-clockwise direction. As chamber assembly 11 spins about center axis 18, mouths 24a, 24b, and 24c and drains 26a, 26b, and 26c of chambers 22a, 22b, and 22c are respectively caused to circle around intake track 36 and exhaust track 46.

Figure 8:
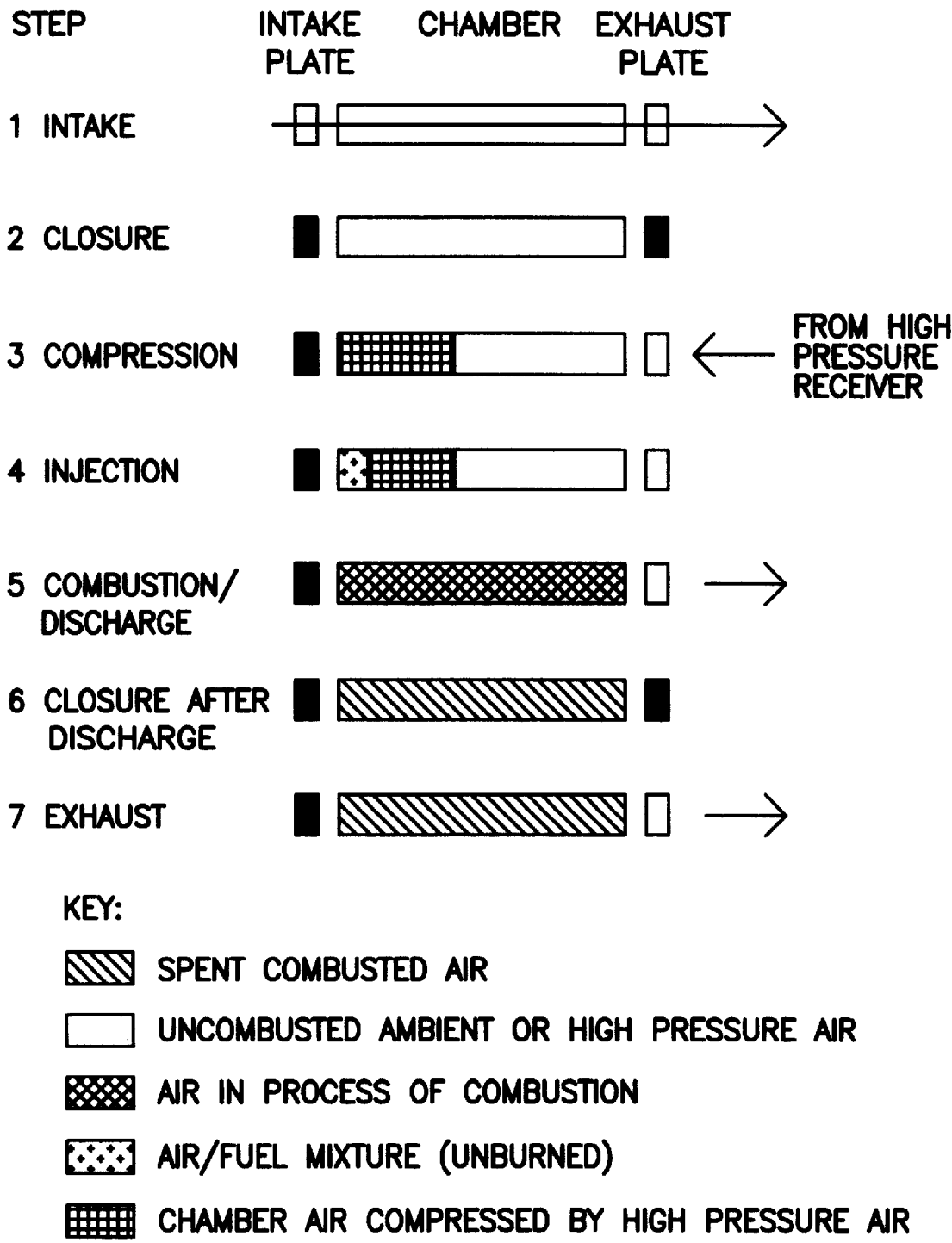
FIG. 8 shows a diagrammatic view of the operational cycle of the gas compressor of FIG. 1, displaying cycle steps performed within chambers of the gas compressor during operation of the gas compressor.
Figure 9:
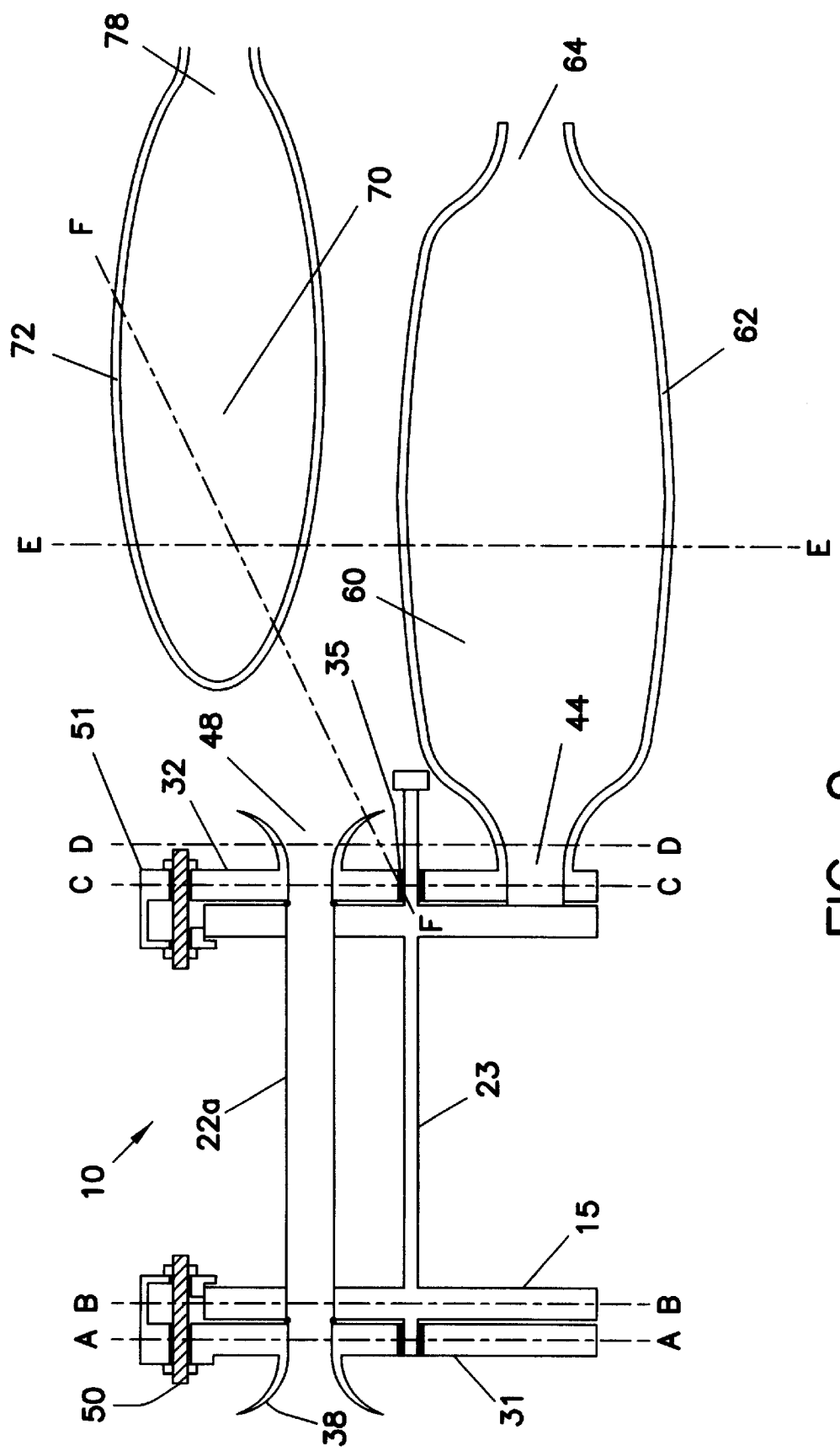
FIG. 9 shows a longitudinal-cross sectional view of a gas compressor which constitutes an alternative embodiment of the invention having an intermediate pressure receiver.
Figure 10:
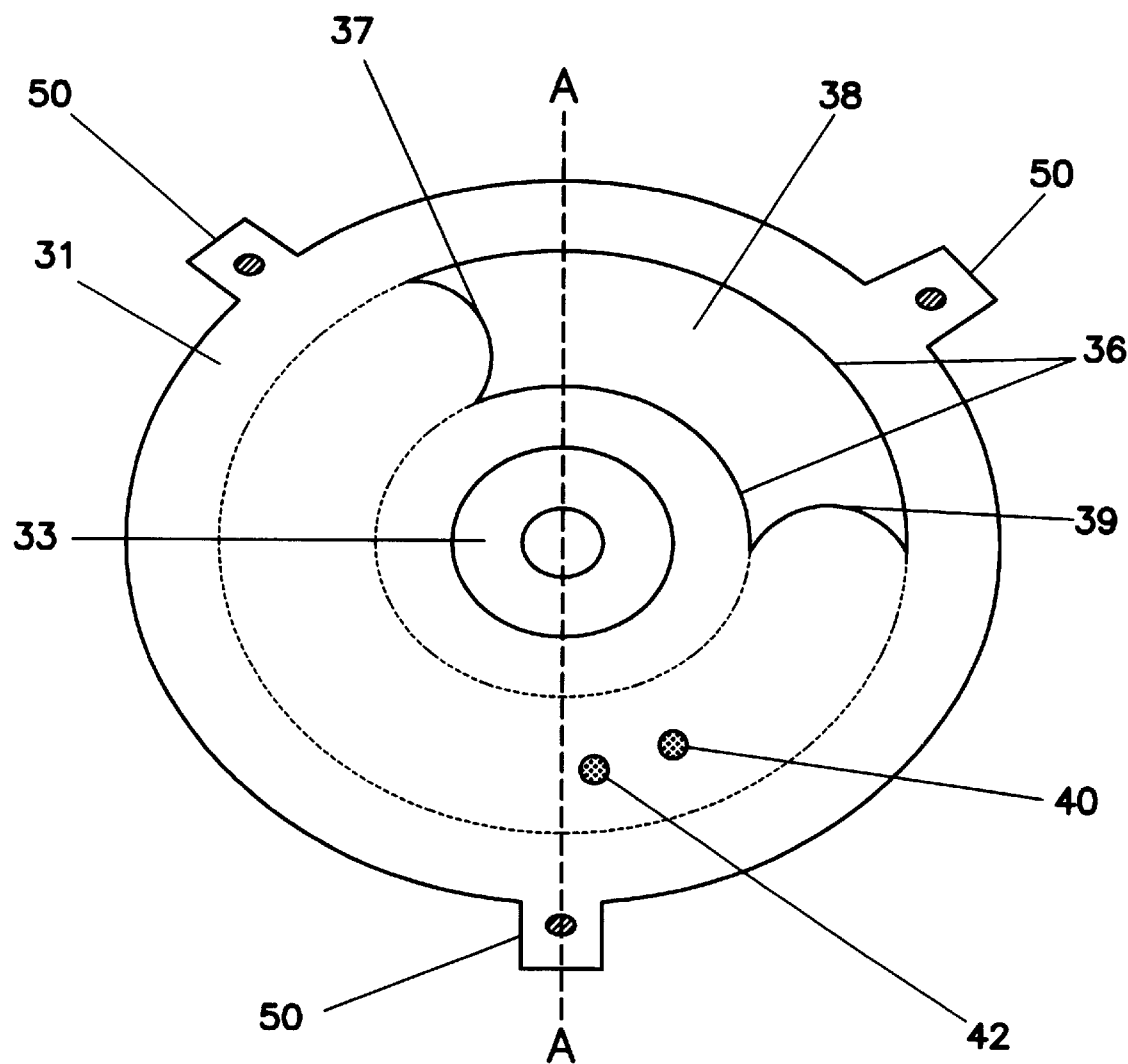
FIG. 10 shows a sectional view of the gas compressor of FIG. 9 along line A—A.
Figure 11:
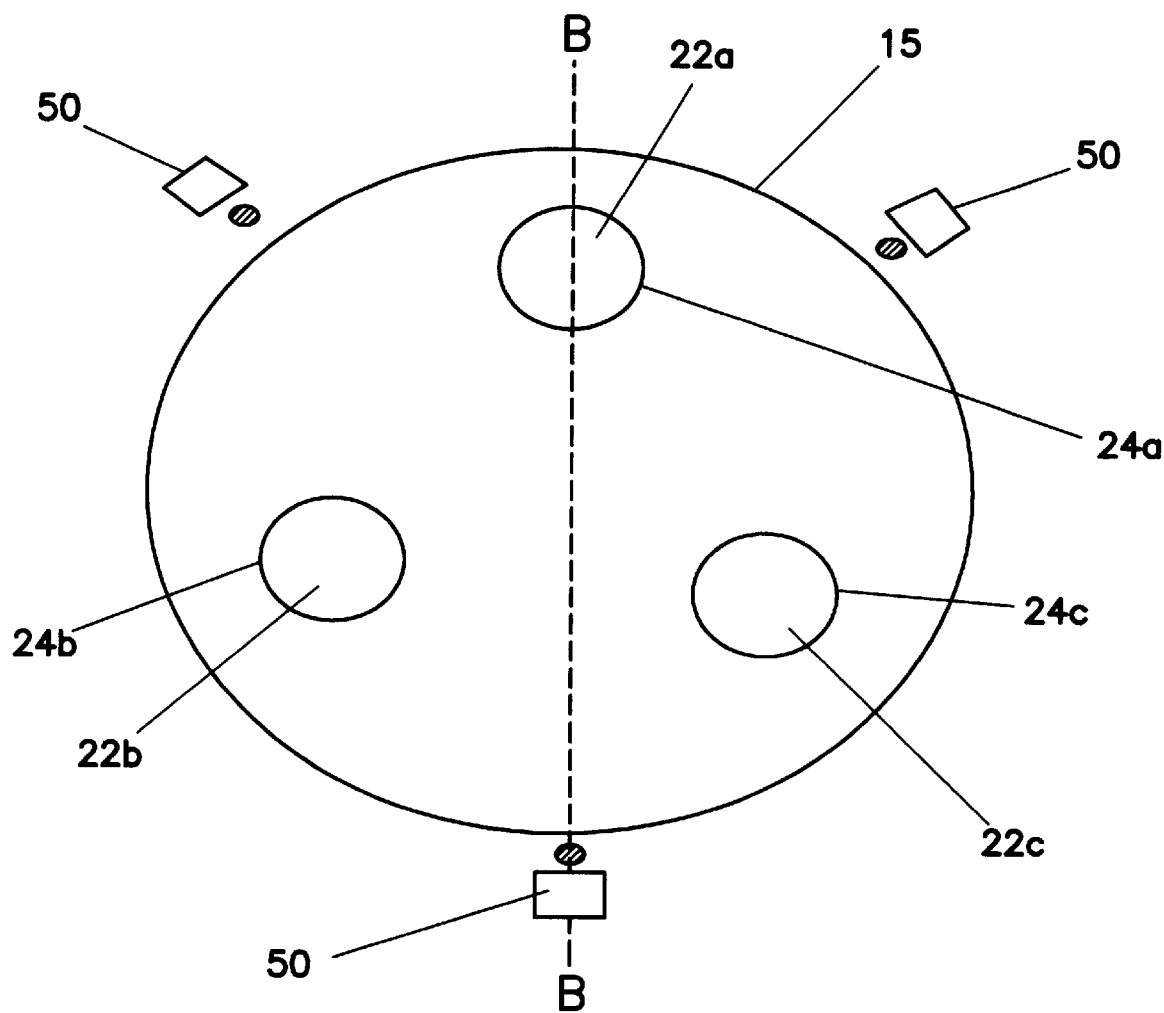
FIG. 11 shows a sectional view of the gas compressor of FIG. 9 along line B—B.

With reference to FIG. 8 showing a diagrammatic view of the steps of the method of the present invention, direct fired compressor 10 operates on a modified Schmidt-type pulsejet cycle. For a discussion of the Schmidt-type pulsejet cycle, see Smith, George Geoffrey, *Gas Turbines and Jet Propulsion*, London, Iliffe, New York, Philosophical Library, 1955, pp. 300–302. This cycle is first described with reference to first chamber 22a revolving around intake track 36 and exhaust track 46, but is also applicable to second chamber 22b and third chamber 23b. Operation of direct fired compressor 10 is dependent upon proper alignment of intake plate 31 with exhaust plate 32 so that first chamber mouth 24a and first chamber drain 26a are opened or closed at the appropriate times during cycle steps. For example, operation of the first cycle step requires first chamber mouth 24a to be positioned upon intake track 36 at forward end 37 of intake port 38 when first chamber drain 26a is positioned upon exhaust track 46 between forward end 47 and rearward end 49 of exhaust port 48. Proper alignment of intake plate 31 with exhaust plate 32 must be accomplished during assembly of direct fired compressor 10.

The first operational step of direct fired compressor 10 provides for intake of air into first chamber 22a ("step 1"). This step begins when first chamber mouth 24a is positioned upon intake track 36 at forward end 37 of intake port 38. At the same time, first chamber drain 26a is positioned upon exhaust track 46 between forward end 47 and rearward end 49 of exhaust port 48. This position of first chamber drain 26a upon exhaust port 48 is generally closer to forward end 47 than rearward end 49. With first mouth 24a open and first drain 26a open, air is allowed to flow freely into and through first chamber 22a. The flow of air into first chamber 22a may be assisted by providing a fan as part of intake port 38 or exhaust port 48.

Rotation of chamber 22a upon intake track 36 and exhaust track 46 brings about the second step in the cycle of chamber closure ("step 2"). First drain 26a is closed as first chamber 22a moves past rearward end 49 of exhaust port 48. At this point, first mouth 24a is still open with respect to intake port 38, and the air rushing into first chamber 22a experiences some compression from the pressure of the flowing air pressing against closed first drain 26a. Accordingly, a pressure wave is propagated in the first chamber 22a from the first drain 26a toward the first mouth 24a. Following closure of first drain 26a, first chamber 22a is moved past rearward end 39 of intake port 38, and first mouth 24a is also closed. Ideally, the first mouth 24a should be closed just before the pressure wave reaches the first mouth 24a. At this point, complete chamber closure has occurred, and the cycle is ready to move on to the next step. Although the duration of complete chamber closure will typically be minimized to increase the capacity of the device, the duration of complete chamber closure may be adjusted to provide resonance at the desired rotational rate.

The third step in the cycle is compression of chamber air by high pressure receiver 60 ("step 3"). With first mouth 24a remaining closed, first chamber 22a is caused to rotate to forward end 43 of discharge port 44, and first drain 26a is open toward high pressure receiver 60. The air in high pressure receiver 60 is at an increased pressure compared to the air in first chamber 22a following the closure step. Thus, when high pressure receiver 60 is opened to first chamber 22a, the air in high pressure receiver 60 rushes into first chamber 22a to compress the existing air in first chamber 22a against closed first mouth 24a, and increases the pressure of the air in first chamber 22a with that of high pressure receiver 60. Accordingly, a pressure wave is again propagated along chamber 22a from first drain 26a toward first mouth 24a. When the pressure wave reaches closed first mouth 24a, the pressure wave is reflected and propagates along chamber 22a from first mouth 24a toward first drain 26a.

The fourth step in the cycle is injection of fuel into first chamber 22a ("step 4"). Injection of fuel is triggered when first mouth 24a reaches fuel injection port 40 on intake track 36. First drain 26a remains open during this step as it moves along discharge port 44 of exhaust track 46. With first mouth 24a open to the fuel injector, a small amount of fuel is injected into first chamber 22a. The fuel placed in first chamber 22a mixes with the air near first mouth 24a to create an air/fuel mixture. The injected fuel mixes with only a small amount of air near first mouth 24a of first chamber 22a and leaves a larger amount of non-combustible air near first drain 26a.

The combustion step is the fifth step of the cycle ("step 5"). Ignition of the spark plug is triggered when first mouth 24a is positioned over ignition port 42. First drain 26a remains open as first chamber 22a rotates to move first drain 26a toward rearward end 45 of discharge port 44. Spark plug ignition causes combustion of the fuel/air mixture existing near first mouth 24a of chamber 22a. As the fuel/air mixture burns, the non-combustible air in first chamber 22a is violently forced toward first drain 26a. The air forced toward first drain 26a is pushed through discharge port 44 and compressed into high pressure receiver 60. Spent gasses, i.e., combusted gasses, remain in first chamber 22a. Ideally, the combustion step is initiated so that the wave formed from combustion reaches first drain 26a at the same time that reflected pressure wave mentioned in step 3 reaches first drain 26a.

Closure after discharge is the sixth step of the cycle ("step 6"). In this step, continued of first chamber 22a rotation moves first mouth 24a away from ignition port 42, and first mouth 24a remains closed. At the same time, first drain 26a is closed as it moves past rearward end 45 of discharge port 44. Spent gasses remain in first chamber 22a. Ideally, step 6 is initiated slightly before, or just as the discharge of non-combustible air into high pressure receiver 60, as described in step 5, is complete. This will allow the maximum amount of air to be discharged from chamber 22a without removal of any of the combusted gasses.

The seventh and final step of the cycle is the exhaust step ("step 7"). In this step, as first chamber 22a continues to rotate, first mouth 24a remains initially closed against intake plate 31 and first drain 26a is rotated to forward end 47 of exhaust port 48, initiating a rarefaction wave at first drain 26a. Spent gasses escape from chamber 22a through first drain 26a, out exhaust port 48, and into the outside air. Also during this step, rotation of first chamber 22a, brings first mouth 24a over forward end 37 of intake port 38, and fresh air thoroughly flushes first chamber 22a as first drain 26a remains open. Ideally, first mouth 24a of chamber 22a will not be opened until rarefaction waves initiated at the discharge end of chamber 22a reach first mouth 24a. At this point, the cycle is ready to repeat with fresh air flowing into first chamber 22a.

The other two chambers, 22b and 22c, simultaneously operate under the same cycle as described above for chamber 22a. Chambers 22b and 22c respectively lag chamber 22a by 120° and 240° within the cycle during operation, as they follow chamber 22a around end plates 31 and 32. By this process, pressurized air is delivered to high pressure receiver 60 by each of chambers 22a, 22b, and 22c. When the air pressure in high pressure receiver 60 reaches a predetermined critical level, outlet port 64 discharges air from the high pressure receiver 60. High pressure receiver 60 operates to dampen the pressurized air pulsations from discharge port 44, and outputs a relatively smooth flow of pressurized air.

An alternative embodiment of the invention may completely remove step 3 from the operation of the device 10, as described above. In this embodiment, first drain 26a would not open to discharge port 44, until after combustion during step 5. Accordingly, the exhaust plate 32 would remain closed to first drain 26a during step 4 because a smaller discharge port 44 would be utilized than that shown in FIG. 5. Exhaust plate 32 would momentarily open during step 5 to allow compressed air from chamber 22a to discharge through discharge port 44 and into high pressure receiver 60.

The direct fired compressor 10 can be operated at a low rate, provided that a means to purge the exhaust from the chambers during the intake step is provided. However, for maximum efficiency, the timing of waves that propagate through the length of the chambers during the closure step (step 2), the compression step (step 3), the combustion/discharge step (step 5), the closure after discharge step (step 6), and the exhaust step (step 7) should be considered, as described above. Proper location and length or the various ports on the intake plate and exhaust plate will allow for the establishment of resonance at a specific rotational rate. This is the preferred speed of operation. Operation outside of the resonant rotational rate will increase specific fuel consumption, reduce the output of the device, and decrease the maximum attainable pressure ratio.

With respect to obtaining a resonant rotational rate, it is important to note that the resonant frequency depends, in part, on the time required for waves to traverse the chambers of the device. This time is dependent only upon (i) the pressure ratio of the high pressure receiver and the ambient air, (ii) the temperature of the ambient air, and (iii) the length of the chambers. Therefore, the resonant frequency described above varies with these parameters as shown in Table 1 below:

| PARAMETER | PROPORTIONAL DEPENDENCE |
| --- | --- |
| Pressure Ratio | Direct |
| Ambient Air Temperature | Direct |
| Chamber Length | Inverse |

The ratio of fuel/air mixture to non-combustible air produced is fixed at an ambient temperature and selected pressure ratio, as is the temperature of the non-combustible air delivered to the reservoir.

Inasmuch as these variables of ambient temperature and pressure ratio are typically fixed design parameters for the direct fired compressor, the resonant frequency varies inversely with chamber length. The volume of air displaced by one cycle varies directly with chamber length. Therefore, for a given intake and exhaust plate configuration, increasing the length of the chamber increases the volume directly while reducing the rotational rate directly. These effects cancel each other such that the output of high pressure air at a given pressure ratio and ambient temperature depends only upon the configuration of the intake and exhaust plates. In other words, for a given set of intake and exhaust plates, any chamber length may be used. If a long chamber is used, the resonant rotational rate will be low. If the chambers are shortened, the rotational rate will be increased in proportion to the amount the chamber is shortened. Thus, the combination of chamber length and resonant rotational rate gives a constant output for a particular set of plates, no matter how long the chambers are.

The above described modified Schmidt-type cycle differs from a typical Schmidt type cycle because exhaust gasses are completely removed from the combustion chamber before a subsequent ignition of gasses within the chamber. In addition, the above described cycle is distinguished from a typical Schmidt type cycle because gasses within the combustion chamber are subject to pre-ignition compression by the high pressure gasses in the receiver. This modification of the Schmidt-type cycle increases the output of the direct fired compressor.

Separation of spent exhaust gasses from the unconsumed air in the modified Schmidt-type cycle provides for multiple uses of the output gasses. In particular, the cooler pressurized air in the receiver may be channeled through a nozzle for use as an efficient jet engine wherein a continuous optimal flow of air is presented to the nozzle. Alternatively, the pressurized air in the receiver may be distributed to a turbine as a steady stream of cool air to efficiently turn the turbine blades and provide rotational power (such as is required to rotate chambers 22a, 22b, and 22c about drive shaft 23). The clean, low temperature air in the receiver also allows the direct fired compressor to be used 5 as a simple air compressor.

Figure 12:
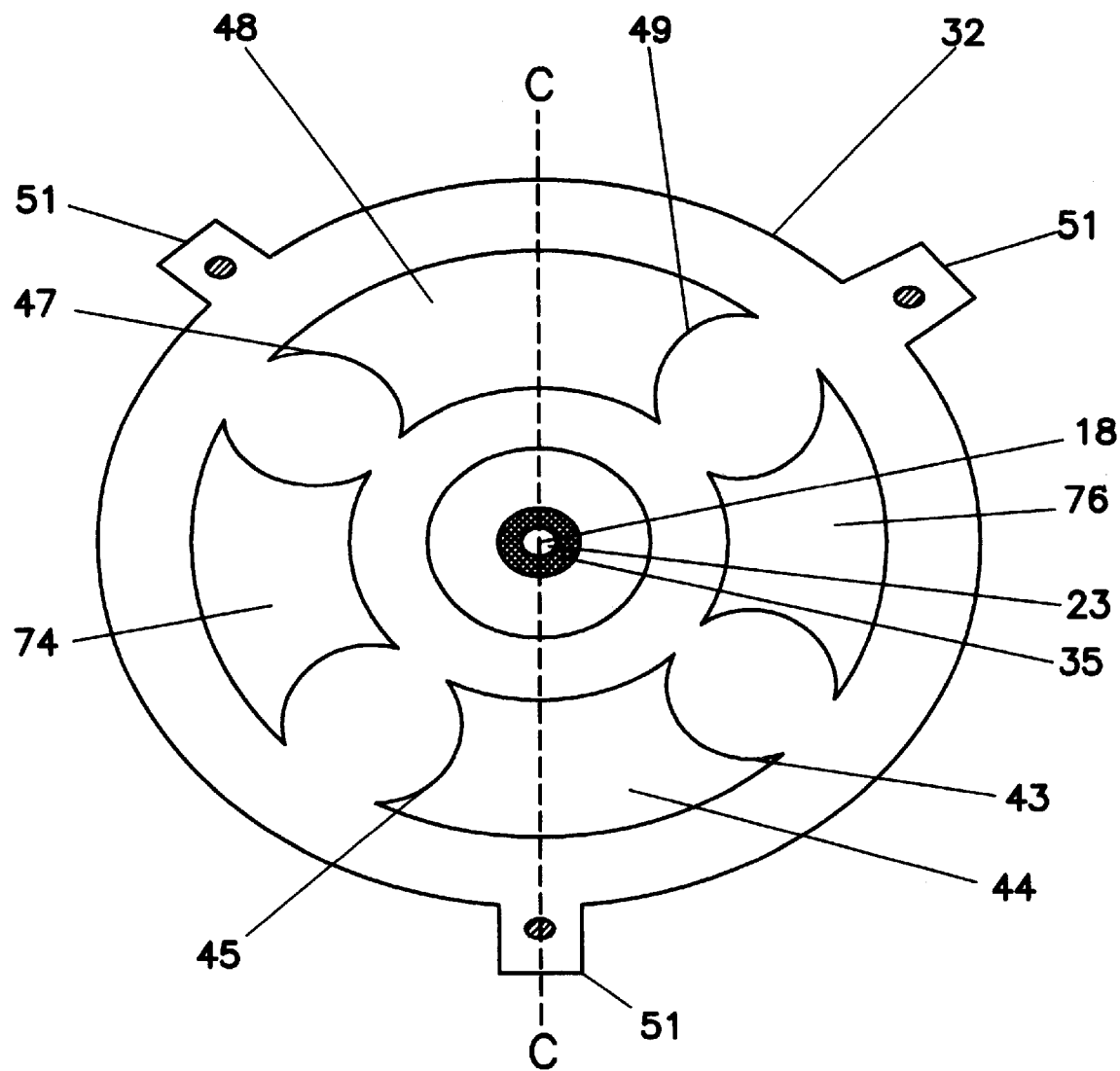
FIG. 12 shows a sectional view of the gas compressor of FIG. 9 along line C—C.
Figure 13:
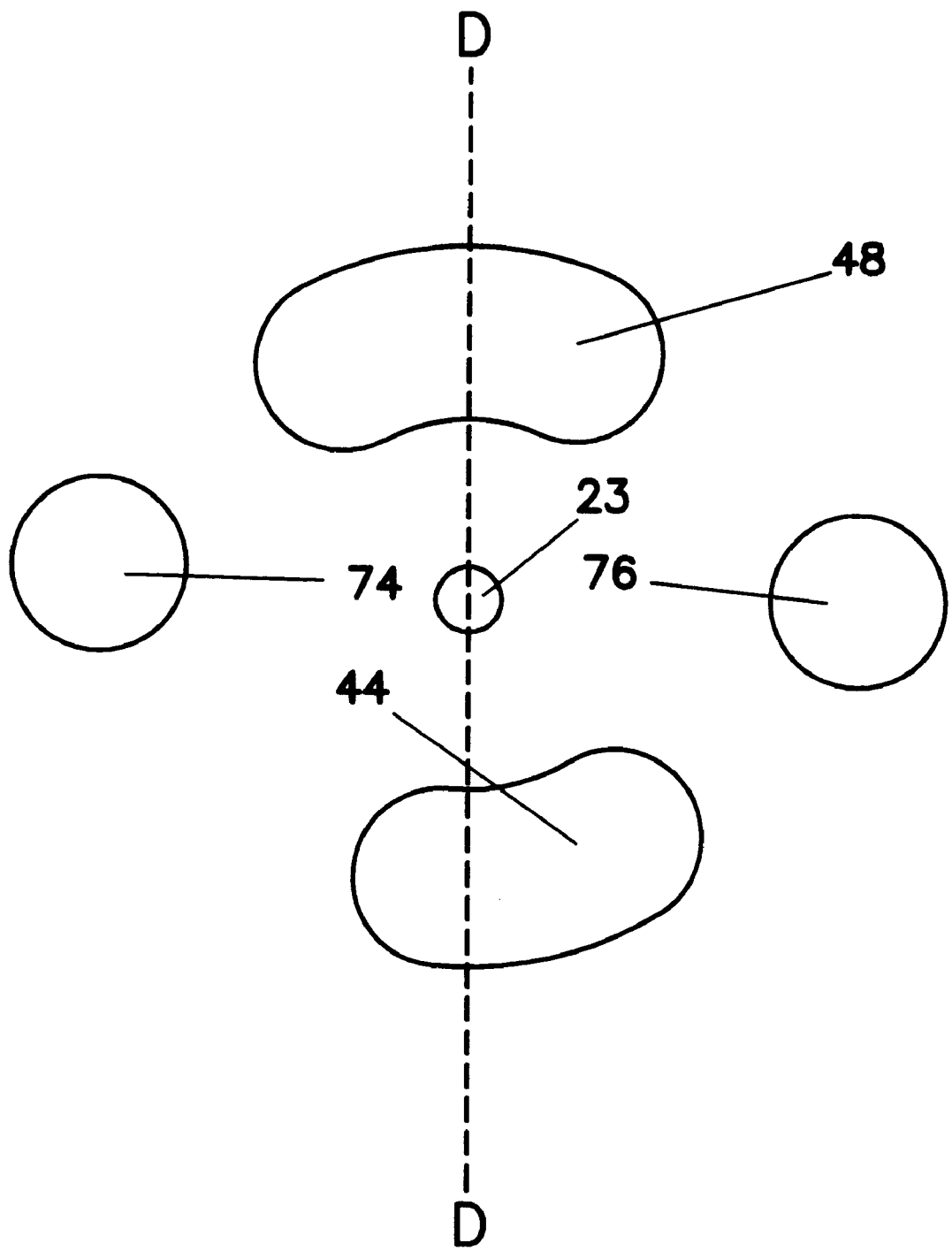
FIG. 13 shows a sectional view of the gas compressor of FIG. 9 along line D—D.
Figure 13A:
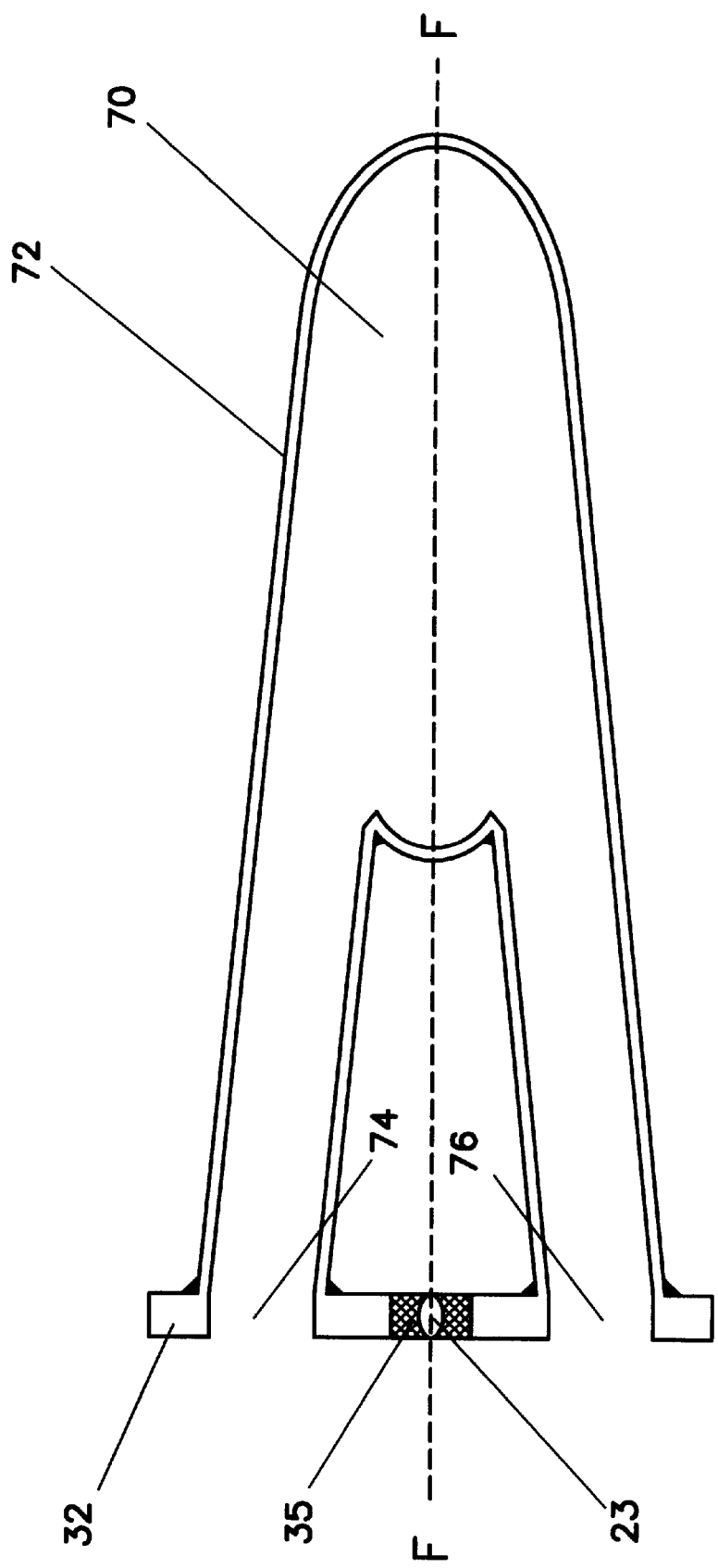
FIG. 13A is a longitudinal sectional view of the gas compressor of FIG. 9, showing the view along line F—F of FIG. 9.
Figure 14:
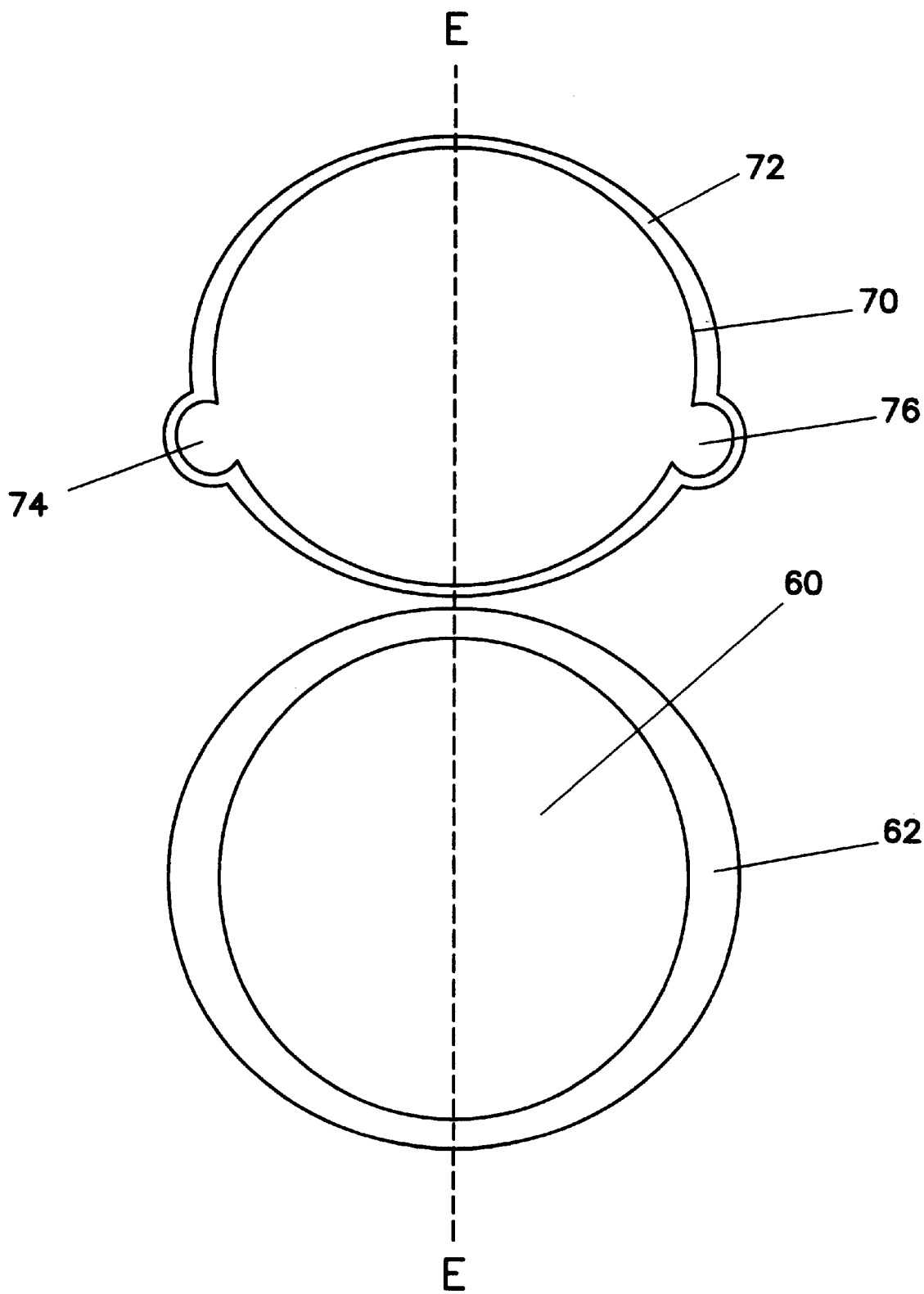
FIG. 14 shows a sectional view of the gas compressor of FIG. 9 along line E—E.
Figure 15:
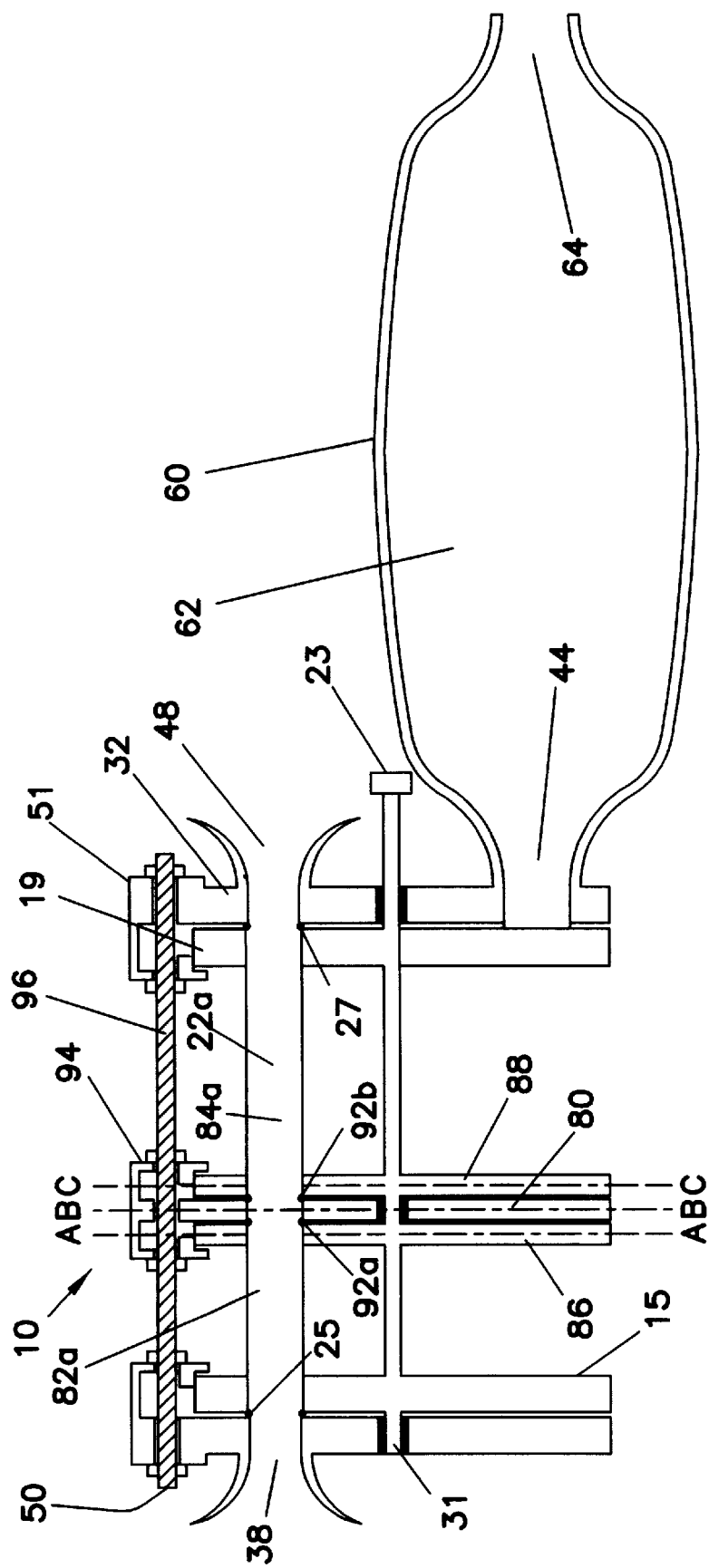
FIG. 15 shows a longitudinal cross-sectional view of a gas compressor which constitutes another alternative embodiment of the invention wherein the chambers are divided by a middle plate.

The above described embodiment of the invention is only one of several useful embodiments. In an alternative embodiment shown in FIGS. 9–14, direct fired compressor 10 further includes an intermediate pressure receiver 70 having an intermediate receiving tank 72 for receiving air from chambers 22a, 22b, and 22c at a lower pressure than the air contained in primary receiving tank 62. An intermediate outlet port 78 is also included on intermediate receiver 70. As shown in FIG. 12, exhaust plate 32 in this embodiment further comprises a recycle port 76 positioned between rearward end 49 of exhaust port 48 and forward end 43 of primary discharge port 44. Recycle port 76 leads into intermediate receiver 70, extending toward intermediate receiving tank 72 (FIG. 13) and eventually connecting an opening in intermediate receiving tank 72 for recycle port 76. In addition, exhaust plate 32 comprises an intermediate discharge port 74 positioned between rearward end 45 of primary discharge port 44 and forward end 47 of exhaust port 48. Intermediate discharge port 74 leads into intermediate receiver 70, extending toward intermediate receiving tank 72 (FIG. 13) and eventually connecting with an opening in intermediate receiving tank 72 for intermediate discharge port 74. This arrangement allows both intermediate discharge port 74 and recycle port 76 to feed 20 into intermediate receiver 70, and provide communication for compressed gasses between chambers 22a, 22b, and 22c and intermediate receiving tank 72.

During operation, pressure is provided to intermediate receiving tank 72 through intermediate discharge port 74. Following combustion in first chamber 22a, compressed air is discharged into primary receiving tank 62, but a portion of compressed air remains in first chamber 22a at a lower pressure than that held by primary receiving tank 62. This remaining amount of compressed air at a lower pressure is channeled to intermediate receiving tank 72 before the exhaust step, and intermediate pressure receiver 70 is pressurized.

Operation of direct fired compressor 10 with intermediate pressure receiver 70 acts to increase the efficiency of direct fired compressor. Efficiency is increased because recycle port 76 is opened to first chamber 22a before primary discharge port 44 is opened to first chamber 22a. This allows intermediate pressure receiver 70 to partially compress the air in first chamber 22a through recycle port 76 before the air is compressed by high pressure receiver 60 prior to the ignition step. Pre-compression of the air in first chamber 22a by intermediate pressure receiver 70 means that less air is required from high pressure receiver 60 to compress the air in first chamber 22a. Accordingly, less high pressure air is lost from high pressure receiver 60 through pre-compression of air in first chamber 22a, and this increases the efficiency of the cycle.

The direct fired compressor with intermediate pressure receiver 70 offers the same advantages over the prior art as the preferred embodiment (e.g. smoother flows, lower turbine feed temperatures, greater mass flow). The principal advantage of the direct fired compressor with intermediate pressure receiver 70 is its improved thermal efficiency over that of the preferred embodiment. The thermal efficiency continues to increase as the number of intermediate pressure chambers and their corresponding ports increase up to its practical limit, at the expense of added complexity, and diminishing effective utilization of frontal area.

Another alternative embodiment of the invention is shown in FIGS. 15–18. In this embodiment each chamber 22a, 22b, and 22c, is essentially split into two segments to provide for separation of combustible air from non-combustible air. For example, chamber 22a includes a first chamber segment 82a and a second chamber segment 84a. Second chamber segment 84a is longer than first chamber segment 82a to provide a greater volume of non-combustible air than combustible air. First chamber segment 82a includes a rear face 86 and second chamber segment includes a forward face 88. Rear face 86 of first chamber segment 82a is identical to forward face 88 of second chamber segment 84a (see FIGS. 16 and 18). A static middle plate 80 is positioned between rear face 86 of first chamber segment 82a and forward face 88 of second chamber segment 84a.

Figure 17:
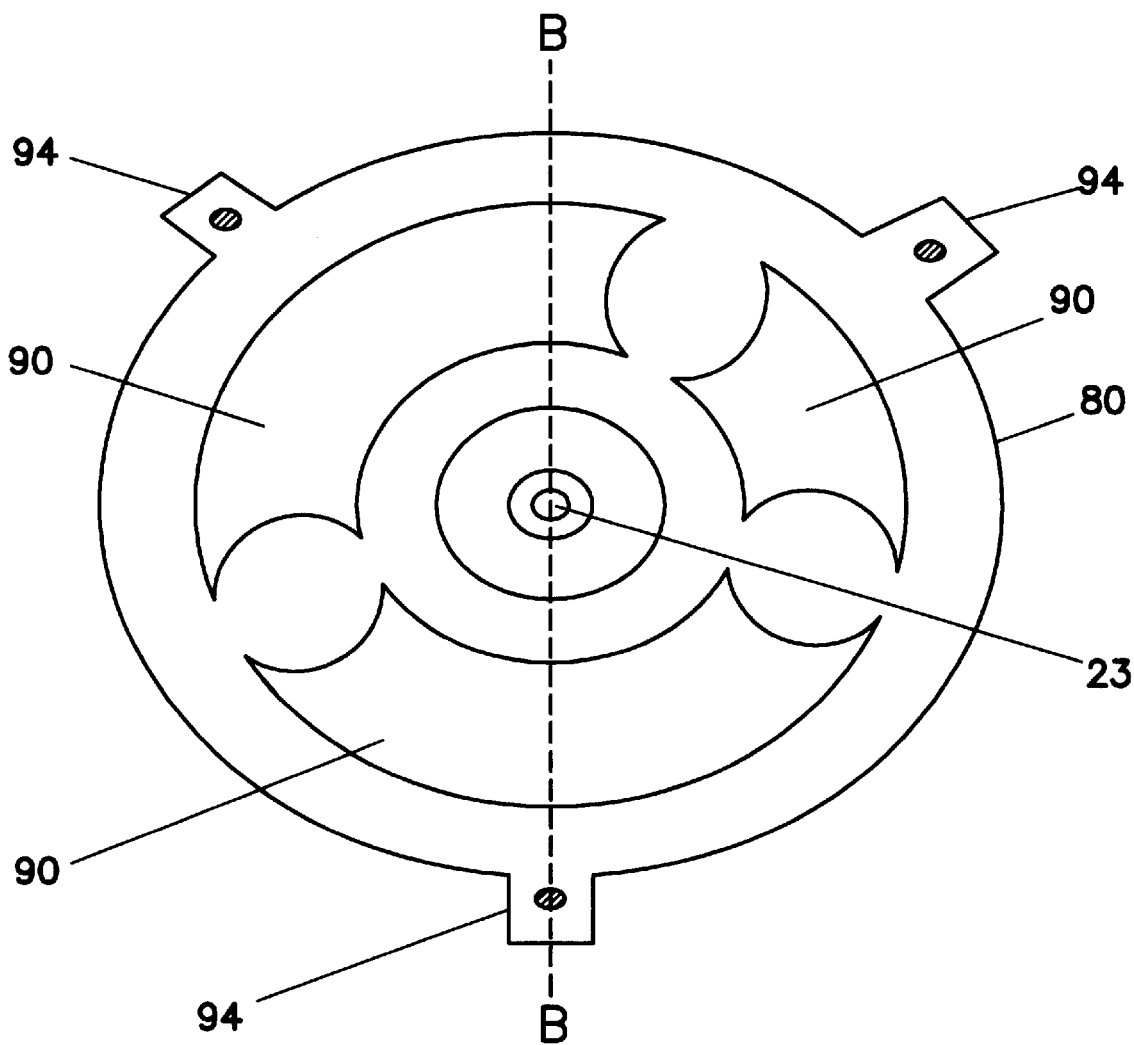
FIG. 17 shows a sectional view of the gas compressor of FIG. 15 along line B—B.

Middle plate 80 includes middle ports 90 (see FIG. 17). Middle ports 90 provide an opening between first chamber segment 82a and second chamber segment 84a during the intake, closure, compression and exhaust steps. Middle ports 90 are closed to first chamber segment 82a and second chamber segment 84a during the injection and combustion steps.

Chambers 22a, 22b, and 22c are sealably positioned against middle plate 80 with middle seals 92a and 92b. Seals 92a seal rear face 86 of first chamber segment 82a against middle plate 80, and seals 92b seal forward face 88 of second chamber segment 84a against middle plate 80. Middle seals 92a and 92b are identical to front seals 25 and back seals 27 and operate to provide an air tight fit between chambers 22a, 22b, and 22c and middle plate 80, while allowing rotation of chambers 22a, 22b, and 22c with respect to middle plate.

Figure 16:
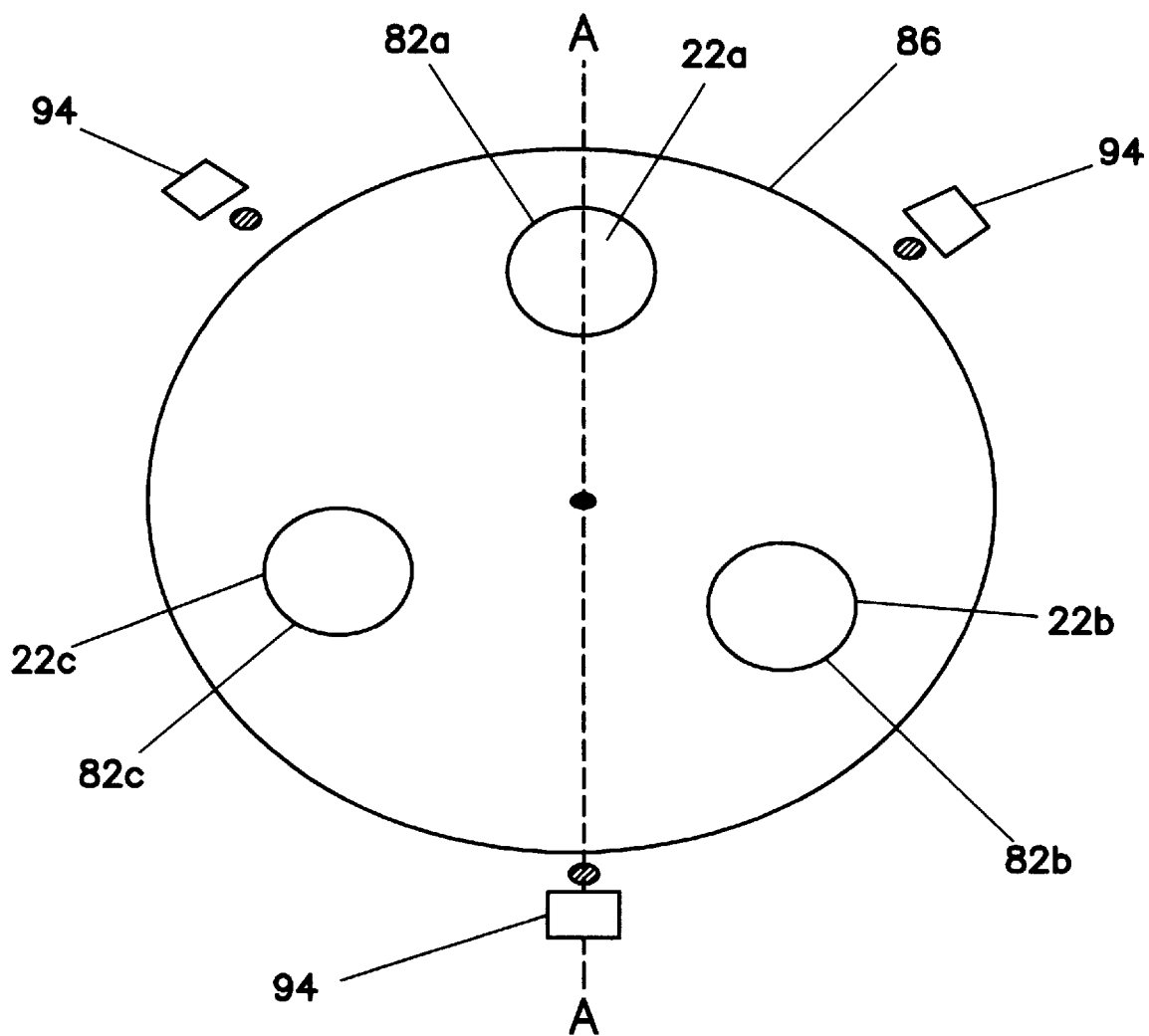
FIG. 16 shows a sectional view of the gas compressor of FIG. 15 along line A—A.
Figure 18:
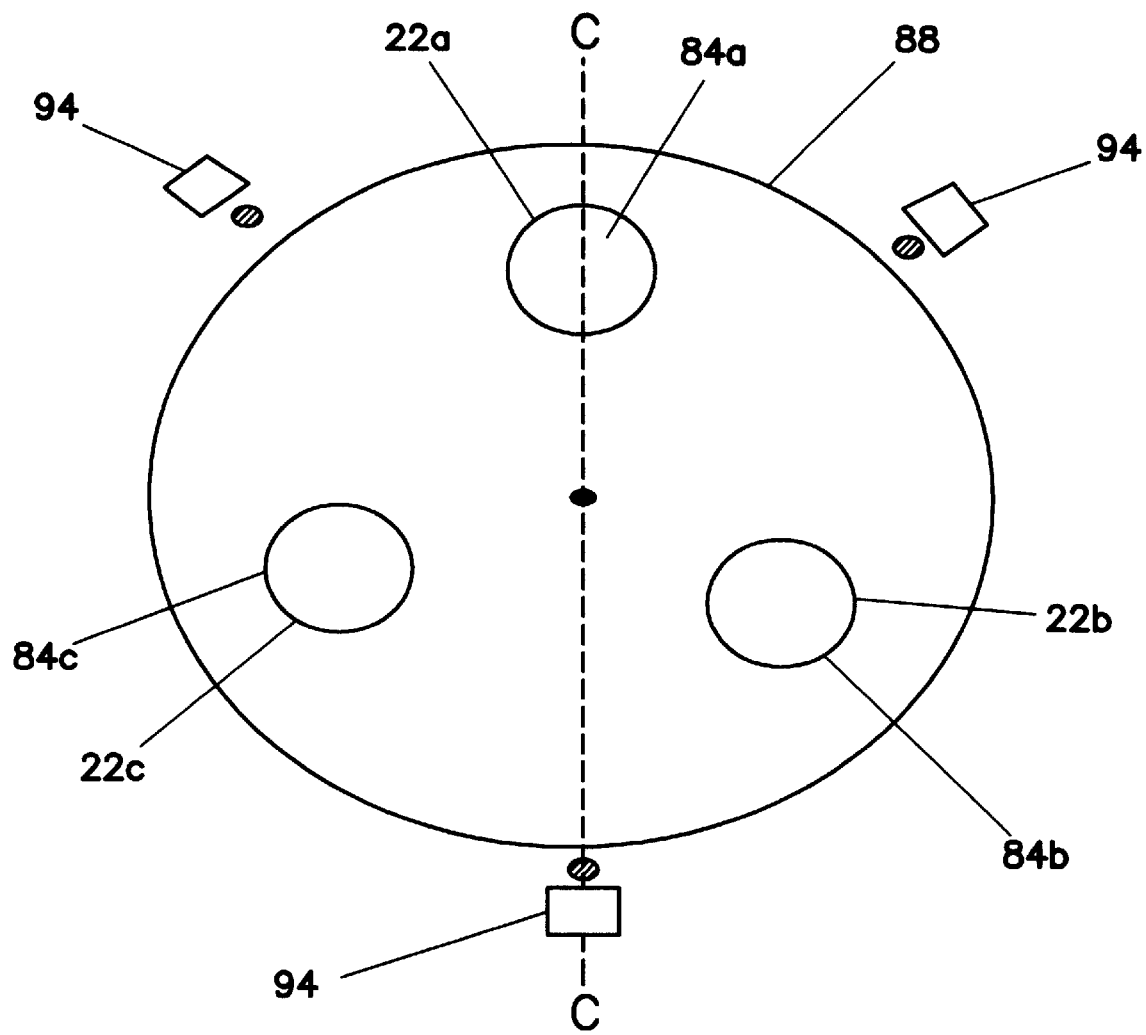
FIG. 18 shows a sectional view of the gas compressor of FIG. 15 along line C—C.

As shown in FIGS. 16–18, middle guides 94 are positioned 120° apart from each other around the circumference of rear face 86, middle plate 80 and forward face 88. Middle guides 94 are integral with middle plate 80 and act as retainers to prevent separation of middle plate 80 from rear face 86 and forward face 88 during operation. Middle guides 94 are secured to guides 50 and 51 by retention bar 96, which fixes the position of the middle plate 88 between rear face 86 and forward face 88.

By separating first chamber segment 82a from second chamber segment 84a, better control over the amount of air that becomes part of the fuel/air mixture is achieved. Furthermore, isolation of first chamber segment 82a from second chamber segment 84a promotes a combustion cycle that burns the fuel/air mixture more evenly within the combustion chamber, and results in a more efficient direct fired compressor 10.

Figure 19:
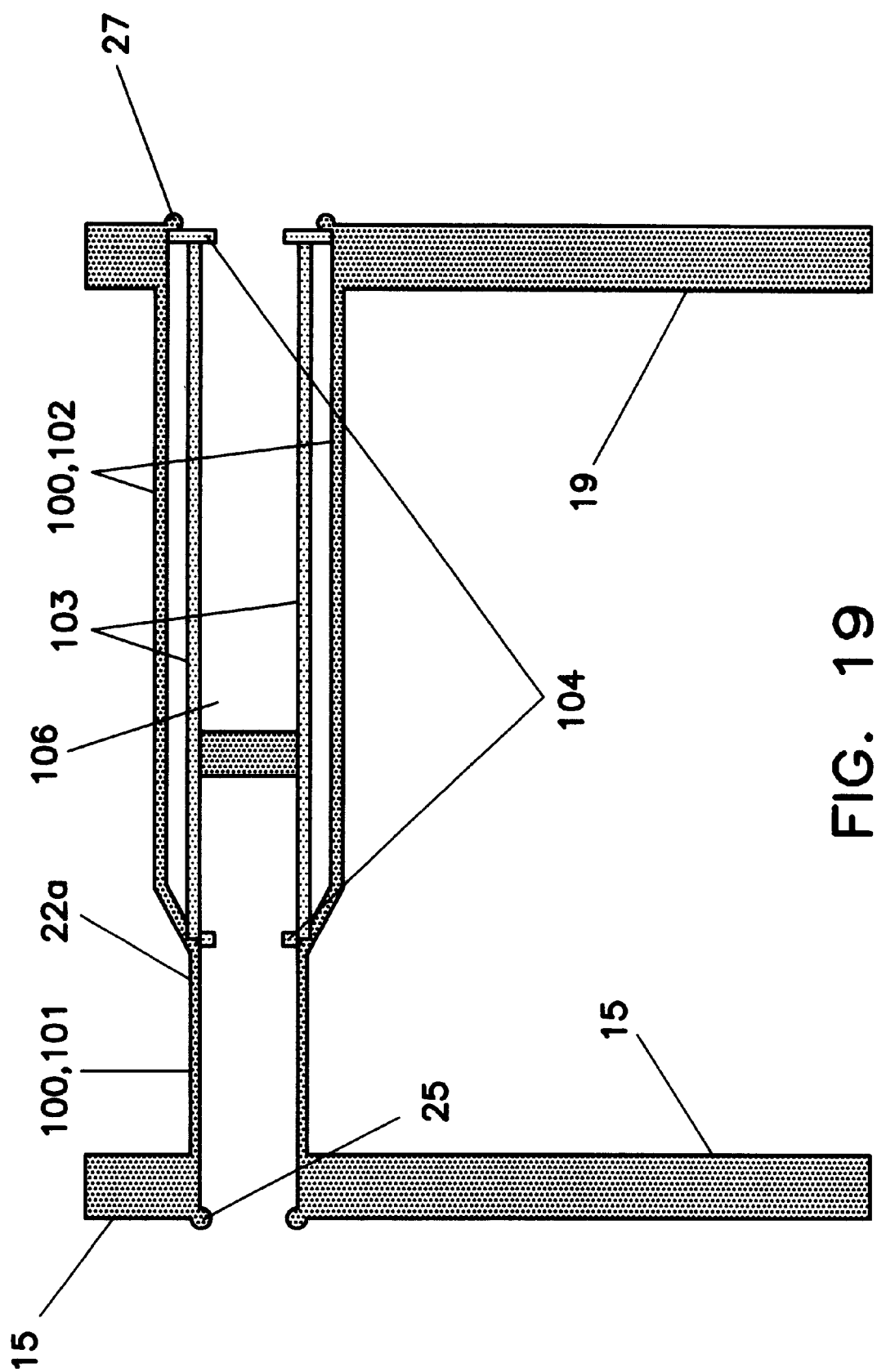
FIG. 19 shows a longitudinal cross-sectional view of a gas chamber of the compressor which constitutes another embodiment of the invention wherein the chambers include a free floating piston.

Another alternative embodiment of the invention is shown in FIG. 19. In this embodiment, chambers 22a, 22b, and 22c each include an exterior chamber 100 having a regular chamber portion 101 and an enlarged chamber portion 102. Shown, for illustrative purposes, is first chamber 22a. Enlarged chamber portion 102 has a greater cross sectional diameter than regular chamber portion 101. Regular chamber portion 101 of exterior chamber 100 extends from first mouth 24a and flares into enlarged chamber portion 102. Enlarged chamber portion 102 of exterior chamber 100 extends to first drain 26a. Contained within and concentric with enlarged chamber portion 102 is a central cylinder 103. Central cylinder 103 engages regular chamber portion 101 and is the same cross-sectional diameter as regular chamber portion 101. Central cylinder 103 includes perforated walls and retainers 104 at its ends. Perforated walls are included on central cylinder 103 to allow air to pass perpendicularly through central cylinder 103. Retainers 104 are also perforated to allow for air to pass through retainers 104. A free floating piston 106 is carried by central cylinder 103 between retainers 104.

During the step of air compression from high pressure receiver 60, piston 106 is forced toward front face 15 of first chamber 22a until piston 106 reaches retainers 104 near regular chamber portion 101. This causes piston 106 to isolate regular chamber portion 101 from enlarged chamber portion 102 during the fuel injection step, thus isolating combustible air from non-combustible air. During the ignition/compression step, piston 106 is thrust first toward drain 26a, and air is forced from first chamber 22a by piston 106. Exhaust gasses and fresh air may flow by piston 106 during other cycle steps by flowing through the perforated walls of central chamber 103 and around piston 106.

By separating combustible air from non-combustible air within chamber 22a with piston 106, better control over the amount of air that becomes part of the fuel/air mixture is achieved. Isolating combustible air from non-combustible air promotes a combustion cycle that burns the fuel/air mixture more evenly within the combustion chamber, and results in a more efficient direct fired compressor 10.

Figure 20:
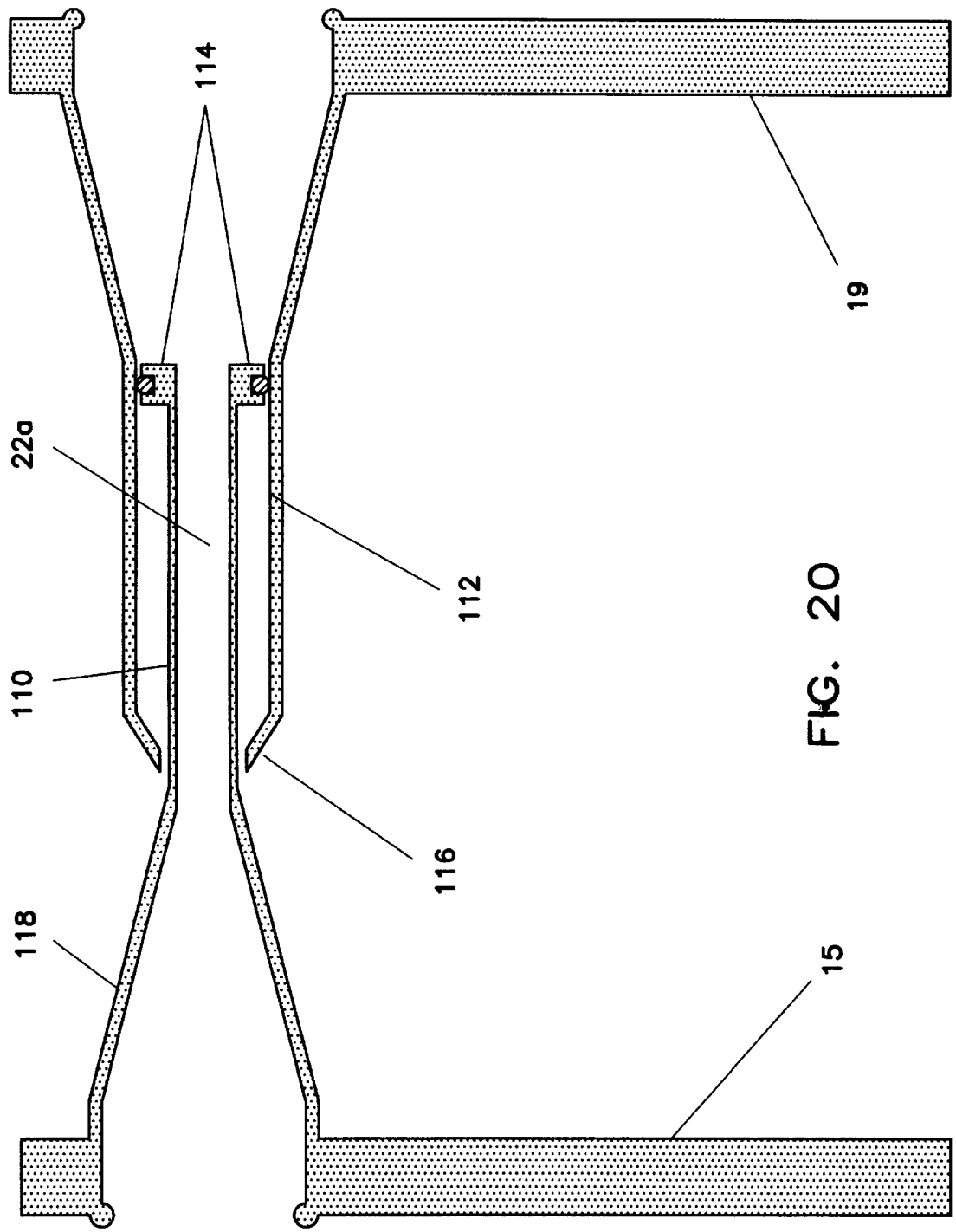
FIG. 20 shows a longitudinal cross-sectional view of a gas chamber of the compressor which constitutes another embodiment of the invention wherein the length of the chamber is adjustable.

As mentioned earlier, the resonant operating frequency of the direct fired compressor 10 is partially dependent upon the length of the chambers. Accordingly, in an alternative embodiment of the invention, the length of chamber 22a is variable to allow for "tuning" of the direct fired compressor to resonant frequency. As shown in FIG. 20, chamber 22a has a first cylinder portion 110 and a second cylinder portion 112. Second cylinder portion 112 is of a larger diameter than first cylinder portion 110, and first cylinder portion 110 slidably fits within second cylinder portion 112. Seals 114 are positioned between first cylinder portion 110 and second cylinder portion 112 to provide an airtight fit between first cylinder portion 110 and second cylinder portion 112 while allowing first cylinder portion to slide within second cylinder portion. Second cylinder portion 112 includes a tapered end 116 which catch seals 114 and prevent first cylinder portion 110 from sliding out of second cylinder portion 112. First cylinder portion 110 includes a flared end 118 which engages tapered end 116 of second cylinder portion to prevent first cylinder portion 110 from sliding too far into second cylinder portion 112. In this manner a telescoping chamber is provided between first cylinder portion 110 and second cylinder portion 112. Moving first cylinder portion 110 within the second cylinder portion 112 changes the length of the chamber and allows the chamber to be "tuned" to a resonant frequency, assuming that the fresh air ratio and pressure ratio remain constant within the chamber.

By varying the length of the chambers, the resonant frequency may also be varied along with the output of the compressor. For example, shortening the length of the chambers will increase the resonant frequency but will not increase the resonant frequency in proportion to the decrease in volume, and thus the total output of the direct fired compressor is higher at the higher rotational rate.

Another alternative embodiment of the invention, shown in FIGS. 21–33, also allows the output of a direct fired compressor 10 to be adjusted by changing the resonant rotational rate. In this embodiment, the operating parameters of chamber volume, length, pressure ratio, and ambient temperature remain fixed, and adjustment of the rotational rate is accomplished by varying the duration of complete chamber closure in step 2. This embodiment uses slidable plates to extend the closed portions of the intake track 36 on the intake plate 31, thus shortening and relocating the intake port 38. Slidable plates are also used on the exhaust plate 32 to adjust the size of the exhaust port 48 and the discharge port 44.

Figure 21:
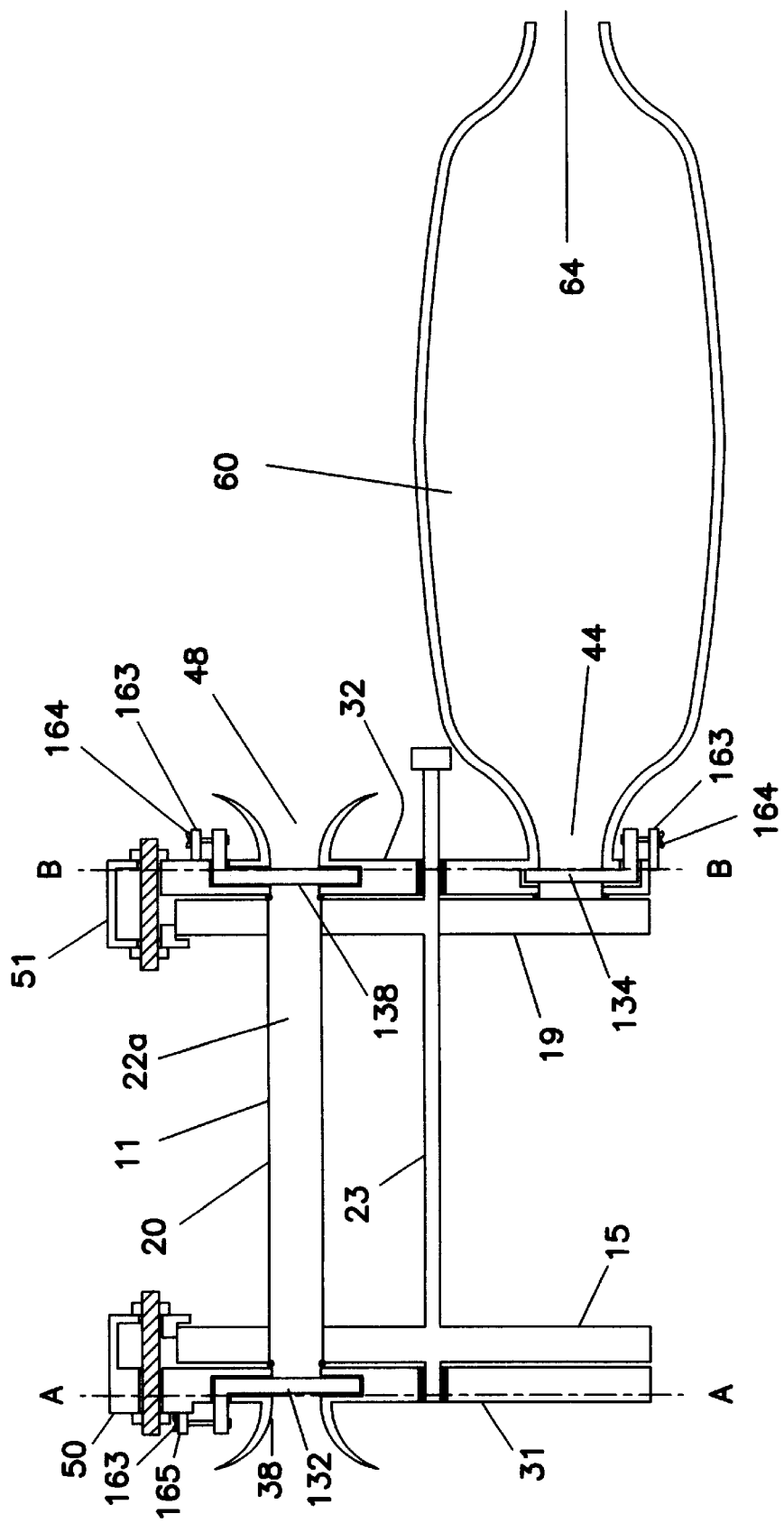
FIG. 21 shows a longitudinal cross-sectional view of a gas compressor which constitutes another embodiment of the invention wherein tuning plates are included in the intake and exhaust plates.
Figure 22:
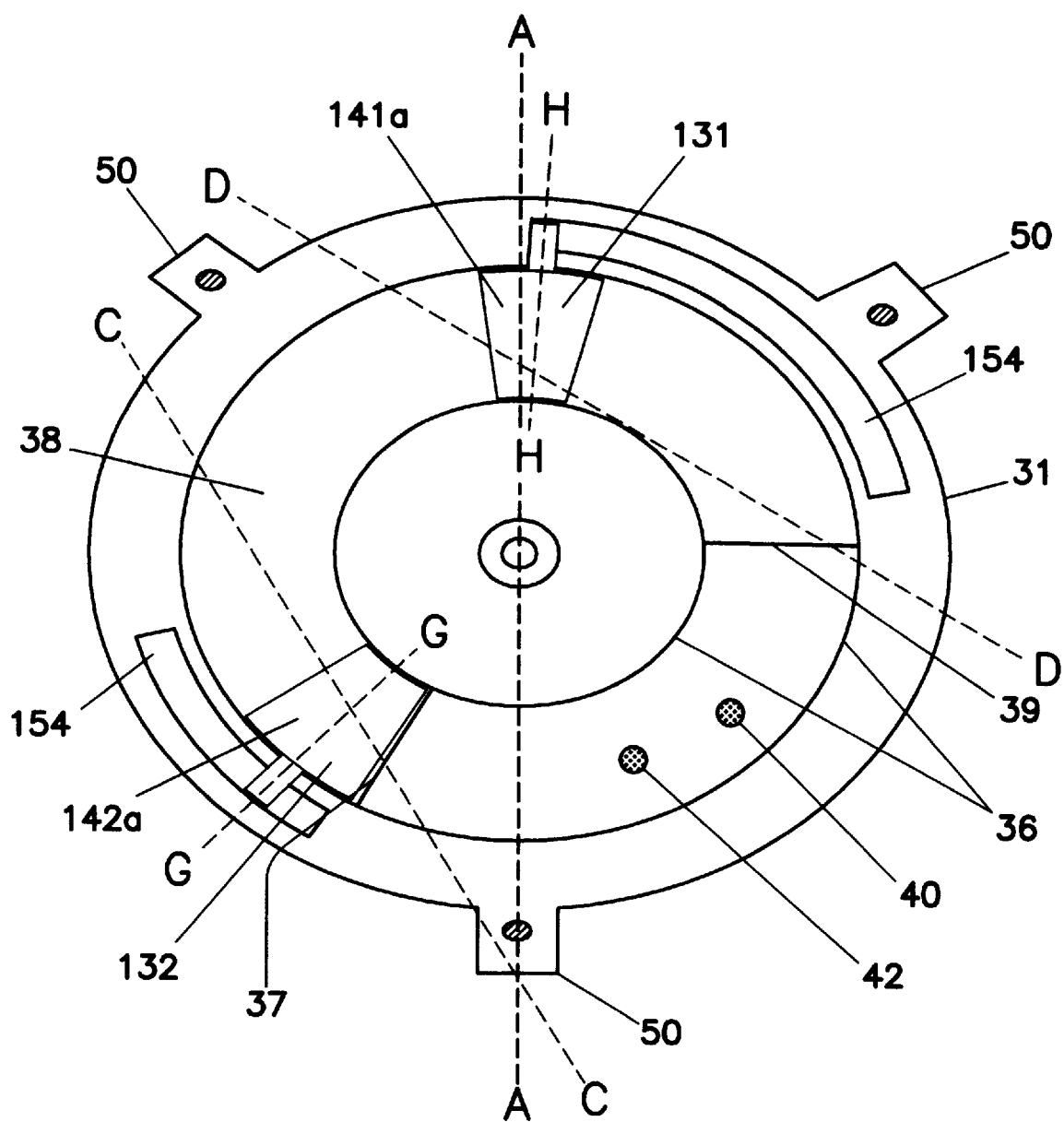
FIG. 22 shows a sectional view of the gas compressor of FIG. 21 along line A—A configured for minimum resonant rate operation.
Figure 23:
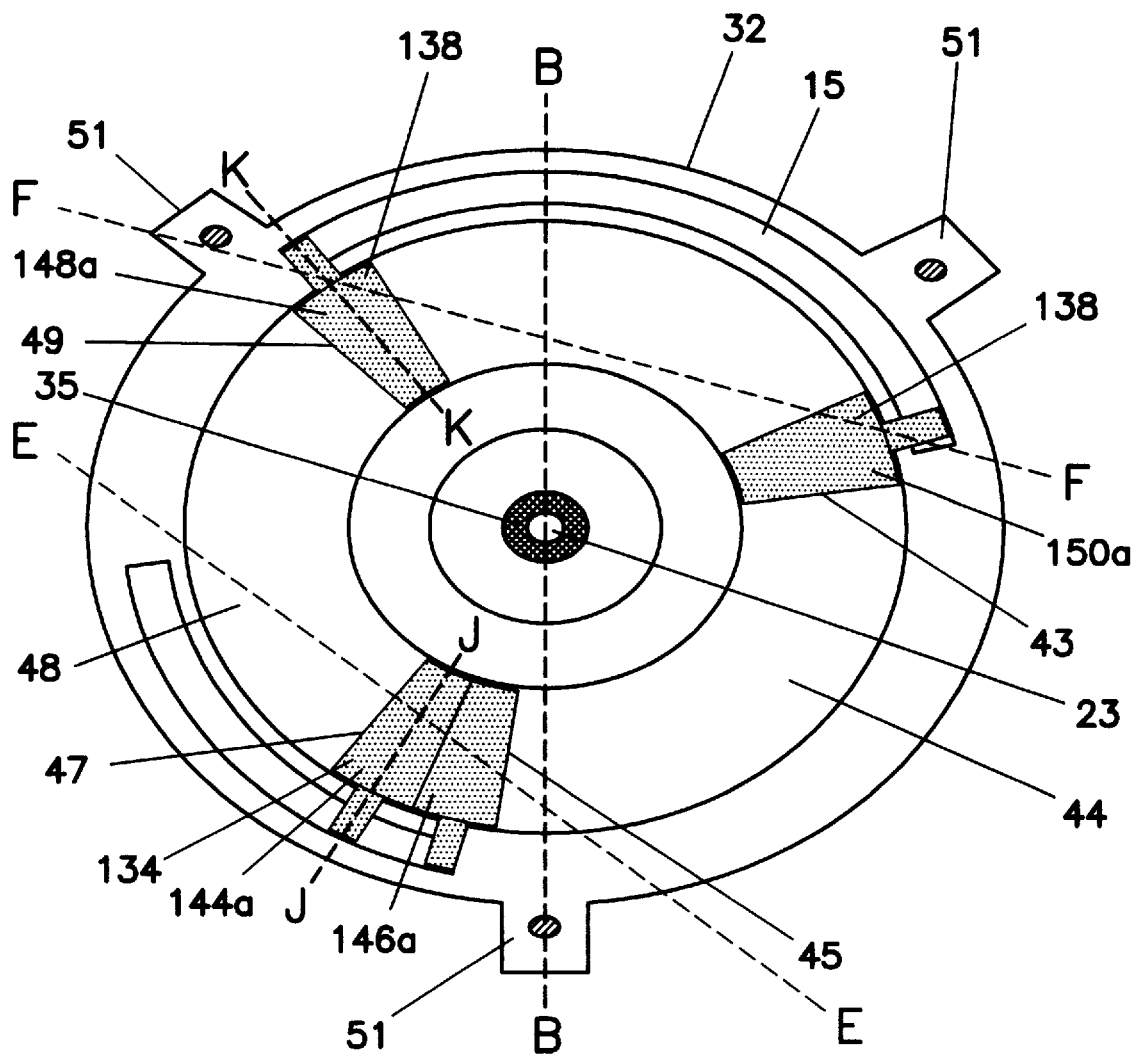
FIG. 23 shows a sectional view of the gas compressor of FIG. 21 along line B—B configured for minimum resonant rate operation.
Figure 24:
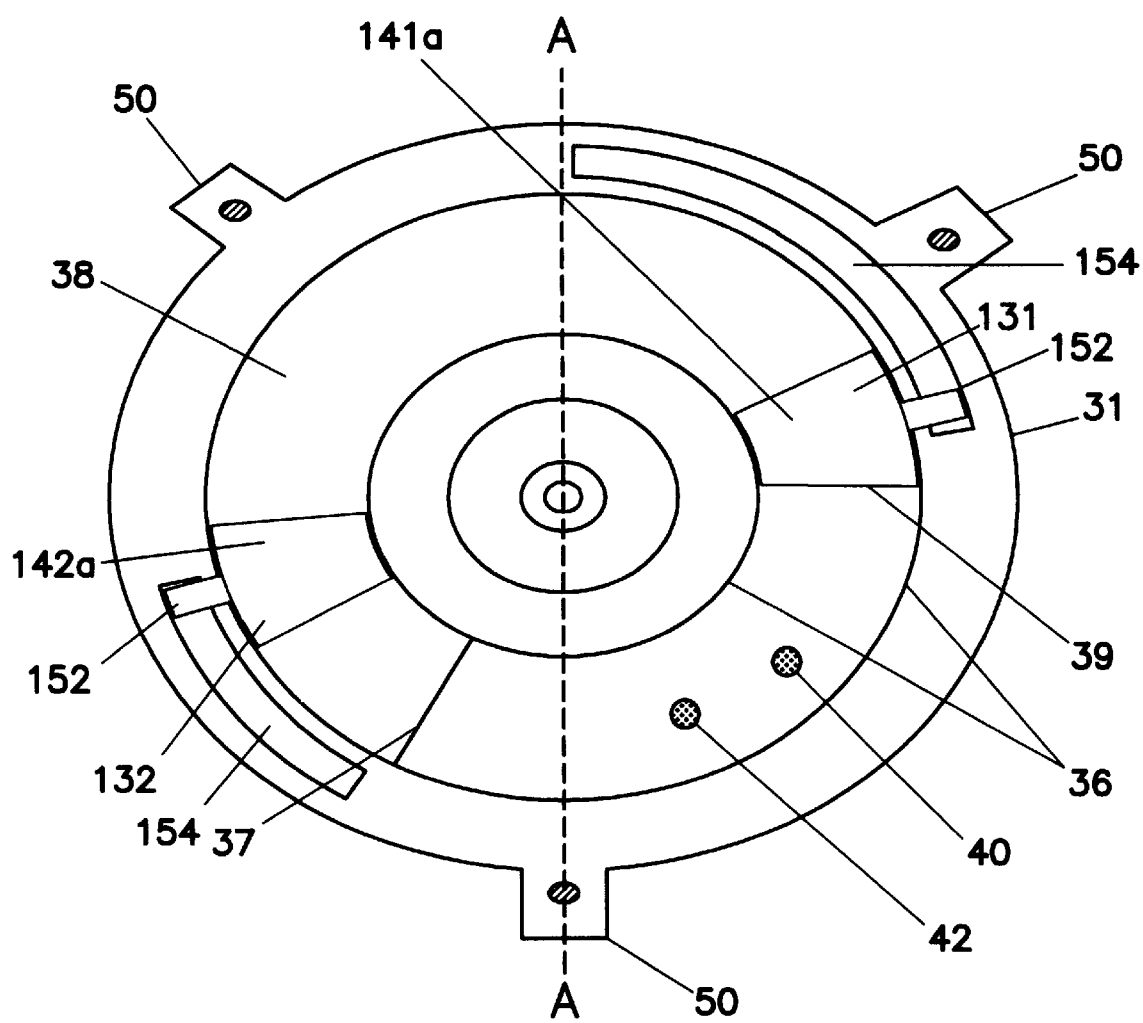
FIG. 24 shows a sectional view of the gas compressor of FIG. 21 along line A—A configured for maximum resonant rate operation.
Figure 25:
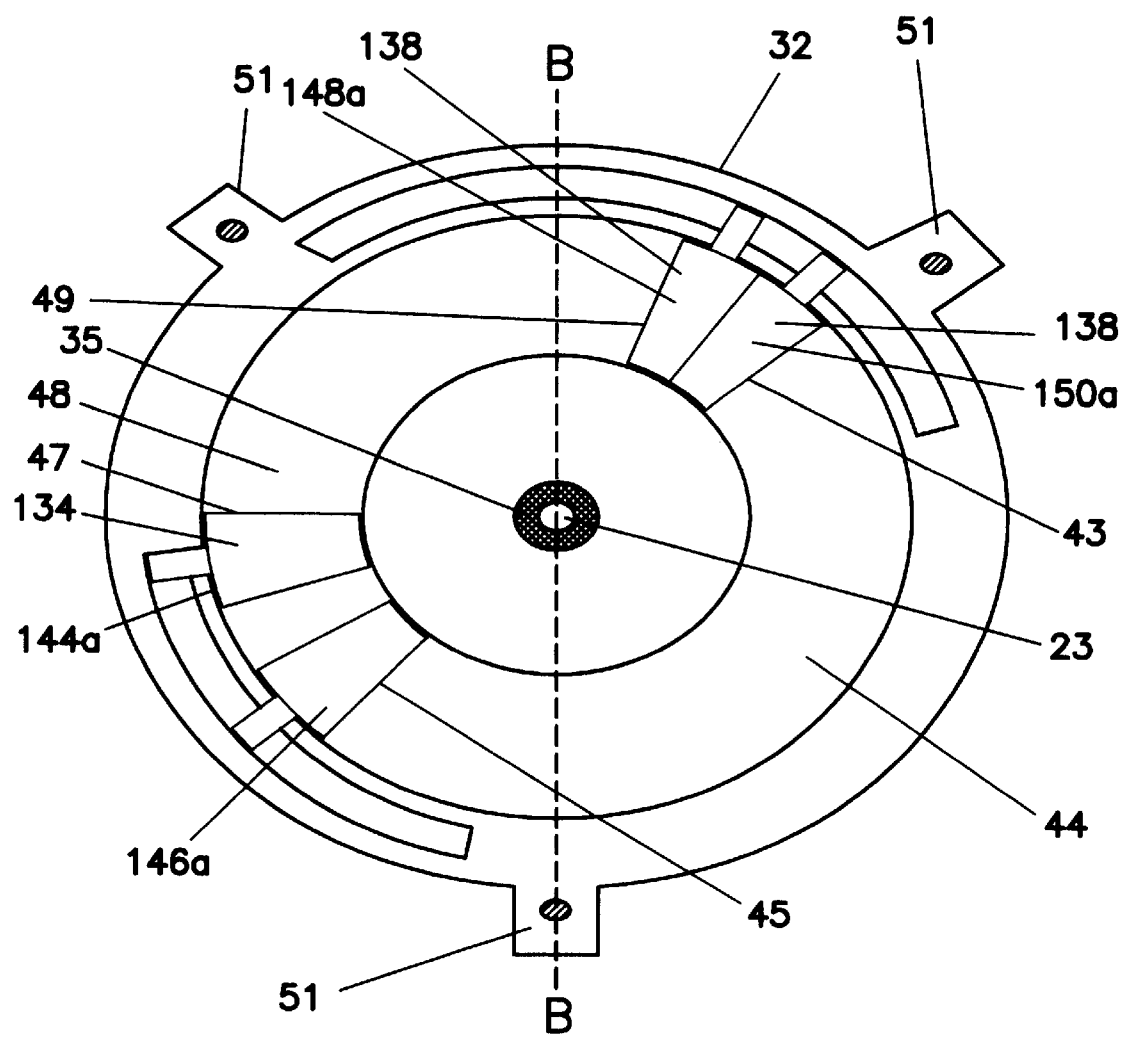
FIG. 25 shows a sectional view of FIG. 21 along line B—B configured for maximum resonant rate operation.

The embodiment of the direct fired compressor shown in FIGS. 21–33 is similar in design and operation to the preferred embodiment shown in FIGS. 1–5. Referring to FIG. 21, the difference for this embodiment is the inclusion of a first slidable plate assembly 131, a second slidable plate assembly 132, a third slidable plate assembly 134, and a fourth slidable plate assembly 138. Slidable plate assemblies 131 and 132 are situated within intake port 38, and slidable plate assemblies 134 and 138 are situated within exhaust port 48 and discharge port 44. The placement of these plate assemblies within the respective ports is illustrated in FIGS. 22–25. FIGS. 22 and 23 illustrate the positioning of the plate assemblies for minimum resonant rate. FIGS. 24 and 25 illustrate the positioning of the plate assemblies for maximum resonant rate.

FIG. 26 shows second plate assembly 132 of FIG. 22 along line C—C. Second plate assembly 132 is shown in its most counterclockwise position (minimum extension) and comprises three individual plates 142a, 142b, and 142c, slidably stacked upon each other. Plate 142a is the plate in assembly 132 which is closest to the chamber mouths and provides a seal surface as the chamber mouths rotate past the plate assembly 132. Plate 142a forms an extension of forward end 37, and is shown near forward end 37 in FIG. 26. Seal elements 133 are located between stops 137 along the side of each plate to provide and airtight seal as these plates are extended, retracted, and repositioned.

Similarly, FIG. 27 shows first plate assembly of FIG. 22 along line D—D. First plate assembly 131 is shown in its most counterclockwise position (maximum extension) and comprises three individual plates 141a, 141b, and 141c, slidably stacked together. Plate 141a is the plate in assembly 131 closest to the chamber mouths and provides a seal surface as the chamber mouths rotate past plate 141a. Plate 141c is adjoined to rearward end 39 and cooperates with plates 141a and 141b to provide an extension of the rearward end 39. Seal elements 133 are located between stops 137 along the side of each plate to provide and airtight seal between the plates as the plates are extended, retracted, and repositioned.

FIG. 28a shows a cross-sectional view of plate 142a, illustrating tab 152 and seals 153. FIG. 28b is a cross-sectional view of plate 142a along line G—G of FIG. 28a showing the configuration of seals 153 and tab 152. Tab 152 extends through a slot 154 in intake plate 31, shown in FIG. 22, to allow positioning of plate assembly 132. As shown in FIG. 21, tab 152 on plate 142a may be secured to first outer race 165 using a nut and bolt 163.

FIGS. 29a and 29b show cross-sectional views of plate 141a and 141b, illustrating tab 152 and seals 153. The configuration is similar to that of FIGS. 28a and 28b.

FIG. 30 shows third plate assembly 134 of FIG. 23 along line E—E. Third plate assembly 134 comprises plates 135, 144a, 144b, 146a, and 146b, interconnected in a sliding pyramid construction with plate 135 at the pyramid top. The third plate assembly is shown at minimum extension.

FIG. 31 shows fourth plate assembly 138 of FIG. 23 along line F—F. Fourth plate assembly 138 comprises plates 139, 148a, 148b, 150a, and 150b, interconnected in a sliding pyramid construction with plate 138 at the pyramid top. The fourth plate assembly is shown at maximum extension.

FIG. 23 shows exhaust plate 32 with third plate assembly 134 and fourth plate assembly 138 disposed therein. High pressure discharge port 44 is formed as the gap between plate 150a and plate 146a. Exhaust port 48 is formed as the gap between plate 144a and plate 148a. The area between plates 148a and 150a, plate assembly 138, is blanked as shown in FIG. 31 by plates 148a, 148b, 139, 150a and 150b which are sealed by seals 133. Similarly, the area between plates 146a and 144a, plate assembly 134, is blanked by plates 144a, 144b, 135, 146a and 146b shown in FIG. 30, sealed with seals 133. Slots 155 allow the tabs for the third and fourth plate assembly to extend through exhaust plate 32 where they are secured to second outer race 164 using a nut and bolt 163.

Cross-sectional views of the lower plates are shown in FIGS. 32a, 32b, 33a and 33b, with tabs 152 that pass through slots 155 in plate 32 to allow for positioning of these plates.

It will be appreciated by one skilled in the art that step 2 is extended in this configuration as a result of the separation of plates 148a and 150a. Plates 146a, 144a, 141a, and 142a are positioned to provide resonant operation with the extension of these plates.

As mentioned above, FIGS. 24 and 25 show plate positioning for maximum rotational rate with resonant operation. In FIG. 24, plates 142a and 141a have been rotated clockwise to their clockwise most position. Similarly, in FIG. 25, plates 144a, 146a, 148a, and 150a have been rotated clockwise to provide resonant operation at the maximum rotational rate. This results in the maximum extension of plate assemblies 132 and 134 and the minimum extension of plate assemblies 131 and 138. These position changes result in minimizing the duration of complete closure at the end of step 2 while holding the duration of all other steps constant at the higher rotational rate, thus preserving resonant operation while increasing the output.

Figure 34:
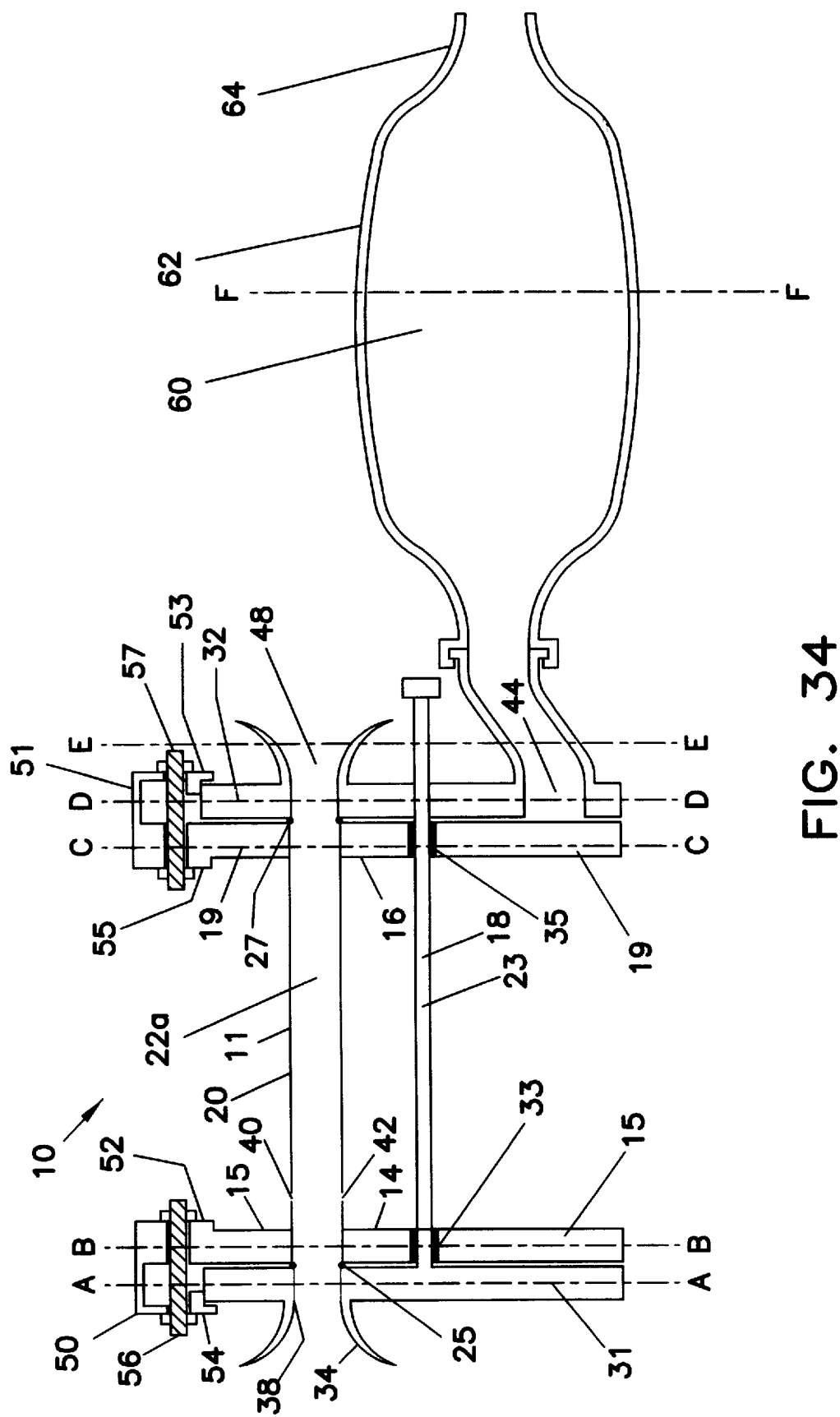
FIG. 34 shows a longitudinal cross-sectional view of a gas which constitutes another embodiment of the invention where the plates rotate instead of the chambers.

The above described embodiments of the present invention is given by way of example only. Other embodiments of the invention may be devised by those of ordinary skill in the art that incorporate the principles of the present invention and fall within the scope thereof. For example, as shown in FIG. 34, the drive shaft may operate to impart rotational motion to the intake plate and the exhaust plate rather than the chamber assembly. In that embodiment, the fuel injection port and the ignition port is positioned upon each chamber wall near the intake end, instead of upon the intake plate. In another alternative embodiment the chamber assembly may contain a single large cylinder which is sub-divided into three chambers, rather than three separate cylinders containing chambers, wherein the cross-sectional shape of the chambers is pie-shaped rather than circular. In still another embodiment, the outlet of the chambers may be ducted out at an angle to add rotational force to the device and substantially reduce or eliminate the force required from an external drive. It is also recognized that the heat from the exhaust port can be recovered via a device such as an interchanger for the application involving a turbine, and that an increase in overall efficiency will result. In another embodiment, fuel could be added to the ambient air at the intake port before it is taken into the chambers. Also, the direct fired compressor is not limited to the use of three chambers. Any number of chambers may be used to implement the invention.

What is claimed is:

1. A gas compressor comprising:
   a. at least one elongated combustion chamber having a chamber wall, an intake end and an exhaust end;
   b. an intake plate adjacent to the intake end of the combustion chamber, the intake plate having a circular intake track with an intake port located upon the intake track, the combustion chamber sealably engaging the intake track and the combustion chamber capable of rotating relative to the intake plate around to the intake track;
   c. an exhaust plate adjacent to the exhaust end of the combustion chamber, the exhaust plate having a circular exhaust track with an exhaust port and a primary discharge port located upon the exhaust track, the combustion chamber sealably engaging the exhaust track and the combustion chamber capable of rotating relative to the exhaust plate upon the exhaust track, the exhaust port providing an opening adapted to expel combusted gases from the combustion chamber;
   d. a primary receiver adjacent to the exhaust plate, the primary receiver adapted to contain compressed gas, the primary discharge port providing an opening into the primary receiver for transferring the compressed gas from the primary receiver to the combustion chamber and subsequently transferring the compressed gas from the combustion chamber to the primary receiver.

2. The gas compressor of claim 1 wherein the intake plate further comprises a fuel injection port upon the intake track.

3. The gas compressor of claim 1 wherein the intake plate further comprises an ignition port upon the intake track.

4. The gas compressor of claim 1 wherein the combustion chamber further includes a fuel injection port positioned upon the chamber wall adjacent to the intake end.

5. The gas compressor of claim 1 wherein the combustion chamber further includes an ignition port positioned upon the chamber wall adjacent to the intake end.

6. The gas compressor of claim 1 further comprising a rotatable drive shaft having an axis of rotation, the drive shaft extending parallel along the combustion chamber, the drive shaft supported at a first location by a bearing positioned in a center bore of the of the exhaust plate.

7. The gas compressor of claim 6 wherein rotation of the drive shaft imparts rotational motion to the combustion chamber about the axis of rotation.

8. The gas compressor of claim 1 further comprising a rotatable drive shaft having an axis of rotation extending parallel along the combustion chamber, wherein rotation of the drive shaft imparts rotational motion to the intake plate and the exhaust plate about the axis of rotation.

9. The gas compressor of claim 1 further comprising at least one intermediate receiver adjacent to the exhaust plate, the exhaust plate further comprising a recycle port upon the exhaust track and an intermediate discharge port upon the exhaust track, the recycle port for transferring compressed gas from the at least one intermediate receiver into the combustion chamber and the intermediate discharge port for transferring compressed air from the combustion chamber to the at least one intermediate receiver.

10. The gas compressor of claim 1 further comprising a first sliding plate assembly located in the intake port, the first sliding plate assembly capable of moving along the intake track to change the size of the intake port.

11. The gas compressor of claim 10 further comprising a second sliding plate assembly located in the intake port, the second sliding plate assembly capable of moving along the intake track to adjust the size of the intake port.

12. The gas compressor of claim 10 further comprising a third sliding plate assembly located in the exhaust port, and a fourth sliding plate assembly located in the exhaust port, the third sliding plate assembly and the fourth sliding plate assembly capable of moving along the exhaust track to adjust the size of the exhaust port.

13. The gas compressor of claim 10 further comprising tabs attached to the first sliding plate to allow the operator of the gas compressor to adjust the size of the intake port.

14. A gas compressor comprising:
   a. a chamber assembly having a face plate with a plurality of elongated combustion chambers extending perpendicularly from the face plate, the plurality of elongated chambers extending to a back plate, the back plate also being perpendicular to the plurality of elongated chambers, the face plate having a plurality of openings forming chamber mouths in the combustion chambers, and the back plate having a plurality of openings forming chamber drains in the combustion chambers;
   b. an intake plate adjacent and parallel to the face plate, the intake plate having a circular intake track with an intake port located on the intake track, the chamber mouths sealably engaging the intake track and the face plate capable of rotating relative to the intake plate such that the chamber mouths rotate around the intake track;
   c. an exhaust plate adjacent and parallel to the back plate, the exhaust plate having a circular exhaust track with an exhaust port located upon the exhaust track and a primary discharge port located upon the exhaust track, the chamber drains sealably engaging the exhaust track and the back plate capable of rotating relative to the exhaust plate such that the chamber drains rotate around the exhaust track;
   d. a primary receiver engaging the primary discharge port, the primary receiver having tank walls and an outlet port, the primary receiver for receiving compressed gas from the combustion chambers, the tank walls for storing compressed gas and the outlet port for providing a stream of compressed gas from the primary receiver.

15. A gas compressor comprising:
   a. a chamber assembly including a first face, a first chamber segment, and a first back, the first chamber segment extending perpendicularly between the first face and the first back, the chamber assembly further comprising a middle plate, a second face, a second chamber segment, and a second back, the middle plate juxtaposed between the first back and the second face and the second chamber segment extending perpendicularly between the second face and the second back, the first chamber segment and the second chamber segment being coaxial;
   b. an intake plate adjacent to the first face, the intake plate having a circular intake track with an intake port located upon the intake track, the first chamber segment sealably engaging the intake track and the first chamber capable of rotating relative to the intake plate around to the intake track;
   c. an exhaust plate adjacent to the second back, the exhaust plate having a circular exhaust track with an exhaust port located upon the exhaust track, the second chamber segment sealably engaging the exhaust track and the second chamber segment capable of rotating relative to the exhaust plate upon the exhaust track.

16. The gas compressor of claim 15 further comprising a primary receiver adjacent to the exhaust plate, the exhaust plate further comprising a primary discharge port upon the exhaust track, the primary discharge port providing an opening into the primary receiver for transferring compressed air from the second chamber segment into the primary receiver.

17. A gas compressor comprising:
   a. a chamber assembly having at least one combustion chamber including an intake end and an exhaust end, the at least one combustion chamber further comprising an enlarged chamber portion coaxial with a central chamber portion, the central chamber portion having perforated walls and retainers located at opposite ends of the central chamber;
   b. a piston slidably held within the central chamber between the retainers;
   c. an intake plate adjacent to the intake end of the at least one combustion chamber, the intake plate having a circular intake track with an intake port located upon the intake track, the at least one combustion chamber sealably engaging the intake track and the combustion chamber capable of rotating relative to the intake plate around to the intake track;
   d. an exhaust plate adjacent to the exhaust end of the at least one combustion chamber, the exhaust plate having a circular exhaust track with an exhaust port located upon the exhaust track, the at least one combustion chamber sealably engaging the exhaust track and the at least one combustion chamber capable of rotating relative to the exhaust plate upon the exhaust track.

18. The gas compressor of claim 17 further comprising a primary receiver adjacent to the exhaust plate, the exhaust plate further comprising a primary discharge port upon the exhaust track, the primary discharge port providing an opening into the primary receiver for transferring compressed air between the at least one combustion chamber and the primary receiver.

19. A gas compressor comprising:
   a. a chamber assembly having a combustion chamber including an intake end and an exhaust end, the combustion chamber further comprising a first cylinder portion and a second cylinder portion, the first cylinder portion of a smaller diameter than the second cylinder portion so that the first cylinder portion is capable of sliding within the second cylinder portion, the first cylinder portion including seals on an end of the first cylinder portion slidably engaging the interior of the second cylinder portion such that the length of the combustion chamber is adjustable;
   b. an intake plate adjacent to the intake end of the combustion chamber, the intake plate having a circular intake track with an intake port located upon the intake track, the combustion chamber sealably engaging the intake track and the combustion chamber capable of rotating relative to the intake plate around to the intake track;
   c. an exhaust plate adjacent to the exhaust end of the combustion chamber, the exhaust plate having a circular exhaust track with an exhaust port located upon the exhaust track, the combustion chamber sealably engaging the exhaust track and the combustion chamber capable of rotating relative to the exhaust plate upon the exhaust track.

20. The gas compressor of claim 19 further comprising a primary receiver adjacent to the exhaust plate, the exhaust plate further comprising a primary discharge port upon the exhaust track, the primary discharge port providing an opening into the primary receiver for transferring compressed air between the combustion chamber and the primary receiver.

21. The gas compressor of claim 19 wherein the first cylinder portion further comprises a flared end near the intake end of the combustion chamber.

22. The gas compressor of claim 21 wherein the second cylinder portion further comprises a tapered end which slidably engages the exterior of the first cylinder portion.

23. A method of producing a steady stream of compressed air comprising the steps of:

a. opening a combustion chamber at an intake end and an exhaust end to allow non-combustible air to flow into the combustion chamber;

b. closing the combustion chamber at the intake end and the exhaust end to enclose the non-combustible air in the combustion chamber;

c. injecting fuel into the combustion chamber to create a combustible fuel/air mixture in the chamber, but leaving an amount of non-combustible air in the combustion chamber;

d. igniting the combustible fuel/air mixture, causing the fuel/air mixture to expand as it is burned, and compressing the non-combustible air into a primary receiver, the exhaust end of the combustion chamber being opened to the primary receiver;

e. closing the exhaust end of the combustion chamber to the primary receiver; and f. opening the exhaust end and the intake end of the combustion chamber to allow exhaust gasses to pass from the combustion chamber.

24. The method of claim 23 further comprising the step after step b. and before step c. of opening the exhaust end of the combustion chamber to the primary receiver, the primary receiver containing air at an increased pressure and compressing the non-combustible air within the combustion chamber to the same pressure as the air within the primary receiver.

25. The method of claim 24 further comprising the step, between steps b and c, of opening the exhaust end of the combustion chamber to an intermediate receiver containing air at an increased pressure, the intermediate receiver compressing the non-combustible air within the combustion chamber to the same pressure as the air within the intermediate receiver.

26. The method of claim 25 further comprising the step, between steps e and f, of opening the exhaust end of the combustion chamber to the intermediate receiver, thereby causing compressed air in the combustion chamber to flow into the intermediate receiver, and then closing the exhaust end of the combustion chamber to the intermediate receiver.

27. The method of claim 23 wherein the combustion chamber is caused to rotate with respect to an exhaust plate connected to the primary receiver, rotation of the combustion chamber with respect to the exhaust plate accomplishing opening and closing of the exhaust end of the combustion chamber.

28. The method of claim 23 wherein the combustion chamber is caused to rotate with respect to an intake plate positioned at the intake end of the combustion chamber, rotation of the combustion chamber with respect to the intake plate accomplishing opening and closing of the intake end of the combustion chamber.

29. The method of claim 23 wherein a plurality of combustion chambers perform steps a–f.

* * * * *